(12) United States Patent
Hasegawa

(10) Patent No.: US 8,379,690 B2
(45) Date of Patent: Feb. 19, 2013

(54) WIRELESS RECEIVER, WIRELESS COMMUNICATION SYSTEM, AND WIRELESS COMMUNICATION METHOD

(75) Inventor: Tsuyoshi Hasegawa, Kawasaki (JP)

(73) Assignee: Fujitsu Limted, Kawasaki (JP)

( * ) Notice: Subject to any disclaimer, the term of this patent is extended or adjusted under 35 U.S.C. 154(b) by 356 days.

(21) Appl. No.: 12/893,649

(22) Filed: Sep. 29, 2010

(65) Prior Publication Data
US 2011/0075711 A1 Mar. 31, 2011

(30) Foreign Application Priority Data
Sep. 30, 2009 (JP) ................................. 2009-228842

(51) Int. Cl.
*H04B 1/00* (2006.01)

(52) U.S. Cl. ........ 375/145; 375/144; 375/148; 375/149; 375/349

(58) Field of Classification Search .......... 375/141–152, 375/260, 343, 346, 347, 349, 350, 354, 364, 375/367; 455/67.11, 67.16, 226.1, 226.2, 455/296, 303; 370/503, 514, 515
See application file for complete search history.

(56) References Cited

U.S. PATENT DOCUMENTS

| | | | | |
|---|---|---|---|---|
| 6,917,642 B1 * | 7/2005 | Rouphael et al. | ............. | 375/140 |
| 7,949,040 B2 * | 5/2011 | Yoshida et al. | ................ | 375/227 |
| 8,077,780 B2 * | 12/2011 | Schilling et al. | .............. | 375/260 |
| 2005/0276314 A1 | 12/2005 | Dateki et al. | | |

FOREIGN PATENT DOCUMENTS
JP  2005-354255  12/2005

OTHER PUBLICATIONS

Gregory E. Bottomley, et al.; "A Generalized RAKE Receiver for Interference Suppression"; IEEE Journal on Selected Areas in Communications, vol. 18, No. 8, dated Aug. 2000.

* cited by examiner

*Primary Examiner* — Dac Ha
(74) *Attorney, Agent, or Firm* — Myers Wolin, LLC

(57) ABSTRACT

A wireless receiver receives a signal obtained by multiplexing a plurality of signals that include a synchronization signal that is spread using a non-orthogonal code not orthogonal to a code for spreading other signals other than the synchronization signal. Then, in a case when the signals other than the synchronization signal are the target signals for decoding, the wireless receiver performs despreading with respect to the received signal using the synchronization signal and estimates the signal amplitude of the non-orthogonal code. Subsequently, the wireless receiver eliminates the spread synchronization signal from the received signal using the estimated signal amplitude of the non-orthogonal code and using the synchronization signal. Eventually, the wireless receiver performs despreading and demodulation with respect to the signal having the spread synchronization signal eliminated therefrom and decodes the target signals for decoding.

10 Claims, 13 Drawing Sheets

WIRELESS RECEIVER, WIRELESS COMMUNICATION SYSTEM, AND WIRELESS COMMUNICATION METHOD

CROSS-REFERENCE TO RELATED APPLICATION

This application is based upon and claims the benefit of priority of the prior Japanese Patent Application No. 2009-228842, filed on Sep. 30, 2009, the entire contents of which are incorporated herein by reference.

FIELD

The embodiments discussed herein are directed to a wireless receiver, a wireless communication system, and a wireless communication method.

BACKGROUND

Typically, in wireless communication performed by mobile communication apparatuses, the code division multiple access (CDMA) technology such as the wideband-code division multiple access (W-CDMA) technology is already in widespread use for enabling a plurality of users to perform wireless communication using the same frequency.

An example is explained below with reference to the W-CDMA technology. For each user at the transmitting end, spread spectrum modulation is carried out, in which the target data for transmission is multiplied by an orthogonal code (a spreading code or a channelization code), and then the spread data (channels) is subjected to multiplexing and modulation before being transmitted. In each apparatus at the receiving end, despreading is carried out, in which the received data is multiplied by the orthogonal code used by the corresponding apparatus, so that the data addressed to that apparatus gets demodulated. By performing such operations, the W-CDMA technology enables a plurality of users to perform high-speed communication using the same frequency without having to encounter interference.

In recent years, to enable more number of users to simultaneously perform high-speed communication using the same frequency, wireless communication is implemented in which spreading and despreading is carried out by making use of an orthogonal code as well as a scrambling code (SC). More particularly, at the transmitting end; with respect to each single bit of the target data for transmission, spreading is carried out by multiplication with an orthogonal code assigned to each channel in each cell or each sector. Subsequently, at the transmitting end; with respect to each single bit (chip) of the data that has been spread with the orthogonal code, further spreading is carried out by multiplication with the SC. Then, the spread data is transmitted after being subjected to multiplexing and modulation. In each apparatus at the receiving end, despreading is carried out in which the received data is first multiplied by the scrambling code used by the corresponding apparatus and then multiplied by the orthogonal code used by the corresponding apparatus so that the data addressed to that apparatus is demodulated.

Consider the case of using the scrambling code. For example, in a cellular phone at the receiving end; at the time of initial operations performed when the power is turned ON or at the time of cell searching, an operation is performed for searching the header position of the scrambling code in the data received from, for example, a wireless base station at the transmitting end. In other words, the cellular phone performs an operation for establishing synchronization. More particularly, the wireless base station performs multiplexing of control signals, such as a pilot signal (CPICH: common pilot channel) in which a single frame has a length of 10 msec and includes 15 slots or a synchronization signal (SCH: synchronization channel), and communication data, such as voice data, and then transmits the multiplexed data.

Herein, the pilot signal represents a signal of a certain bit (chip) pattern that is transmitted in a cyclic manner. The synchronization signal represents a signal including a primary-synchronization channel (P-SCH) and a secondary-synchronization channel (S-SCH), which are spreading codes having the same code length of 256 chips in all cells or sectors. The P-SCH is intermittently transmitted for 15 times within a single frame and is used for obtaining the reception timing of the S-SCH. The S-SCH has 16 kinds of codes. One of the S-SCH codes is transmitted at the same timing as that of the P-SCH and is used for obtaining the beginning of the information separated by frames, that is, for obtaining the header position of the SC.

The cellular phone at the receiving end first establishes synchronization by receiving the P-SCH and then obtains the timing of the S-SCH. Subsequently, the cellular phone receives the S-SCH at the timing obtained from the P-SCH and obtains the header position of the scrambling code from the code of the S-SCH as well as identifies the code group of the scrambling code from the patterns of S-SCH codes assigned to the slots in a single frame. Then, the cellular phone receives the CPICH and calculates a correlation between the received CPICH and each scrambling code included in the identified code group of the scrambling code. For example, in the W-CDMA technology, the cellular phone calculates a correlation between the received CPICH and eight types of the scrambling code and specifies the scrambling code having the highest correlation to be the scrambling code of the cell or the sector at which the cellular phone (mobile terminal) is located.

Thus, the mobile terminal makes use of the identified scrambling code for performing despreading with respect to the data received from the wireless base station. Subsequently, using the orthogonal code assigned to each channel in each cell or sector, the mobile terminal performs despreading with respect to the data so that the data addressed to the mobile terminal is demodulated. Meanwhile, in the case of data transmission from mobile terminals to the wireless base station, the data is transmitted using the scrambling code assigned individually to each mobile terminal.

Patent Document 1: Japanese Laid-open Patent Publication No. 2005-354255

Nonpatent Document 1: Gregory E. Bottomley, Tony Ottosson, Yi-Pin Eric Wang, "A Generalized RAKE Receiver for Interference Suppression", IEEE JOURNAL ON SELECTED AREAS IN COMMUNICATIONS, VOL. 18, NO. 8, AUGUST, 2000

However, in the abovementioned conventional technology; in the case of decoding signals other than a synchronization signal, there are times when interference from the synchronization signal cannot be eliminated. That becomes a particularly significant problem in the case of a fast transmission rate or a high signal-noise (S/N) ratio.

More particularly, in the abovementioned W-CDMA technology, signals other than the synchronization signal are spread using an orthogonal code orthogonal to other codes and a scrambling code thereby eliminating inter-signal interference. On the other hand, the synchronization signal is spread using a code not orthogonal to other codes. Hence, even if the signals other than the synchronization signal are despread using an orthogonal code, the interference from the synchronization signal that has been spread using a code other than orthogonal code cannot be eliminated (canceled). As a result, the interference from the synchronization signal exerts an influence even after performing the despreading. That causes deterioration in the communication quality or in the communication characteristic.

Meanwhile, in the case of a relatively slower transmission rate or a low S/N ratio, the target data for transmission can be transmitted by appending thereto a redundant bit for performing error detection/correction such as forward error correction (FEC). At the receiving end, even in a case when interference from the synchronization signal cannot be eliminated, error detection/correction can be carried out by implementing the FEC so that the interference from the synchronization signal exerts less influence. However, in the case of high-speed transmission using, for example, the high speed downlink packet access (HSDPA) protocol, a redundant bit for error detection/correction can hardly be appended to the target bit for transmission. Consequently, at the receiving end, failure to eliminate the interference from the synchronization signal makes it difficult to carry out accurate error detection/correction. Hence, the interference from the synchronization signal exerts a considerable influence.

SUMMARY

According to an aspect of an embodiment of the invention, a wireless receiver includes a receiving unit that receives a signal obtained by multiplexing a plurality of signals that include a synchronization signal that is spread using a non-orthogonal code not orthogonal to a code for spreading other signals other than the synchronization signal; an amplitude estimating unit that performs, in a case when the other signals are target signals for decoding, despreading with respect to the signal received by the receiving unit using the synchronization signal, and estimates signal amplitude of the non-orthogonal code; a signal eliminating unit that eliminates the synchronization signal in spread form from the signal received by the receiving unit using the signal amplitude of the non-orthogonal code estimated by the amplitude estimating unit and using the synchronization signal; and a decoding unit that performs despreading and demodulation with respect to the signal having the synchronization signal in spread form eliminated therefrom, and decodes the target signals for decoding.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

DESCRIPTION OF EMBODIMENTS

Preferred embodiments of the present invention will be explained with reference to accompanying drawings. The present invention is not limited to the embodiments.

[a] First Embodiment

The description for a first embodiment of the present invention includes the description of an overall configuration of a system including a wireless receiver according to the first embodiment, a sequence of operations performed by the wireless receiver, and the effect of the first embodiment given in that order.

Overall Configuration

Figure 1:
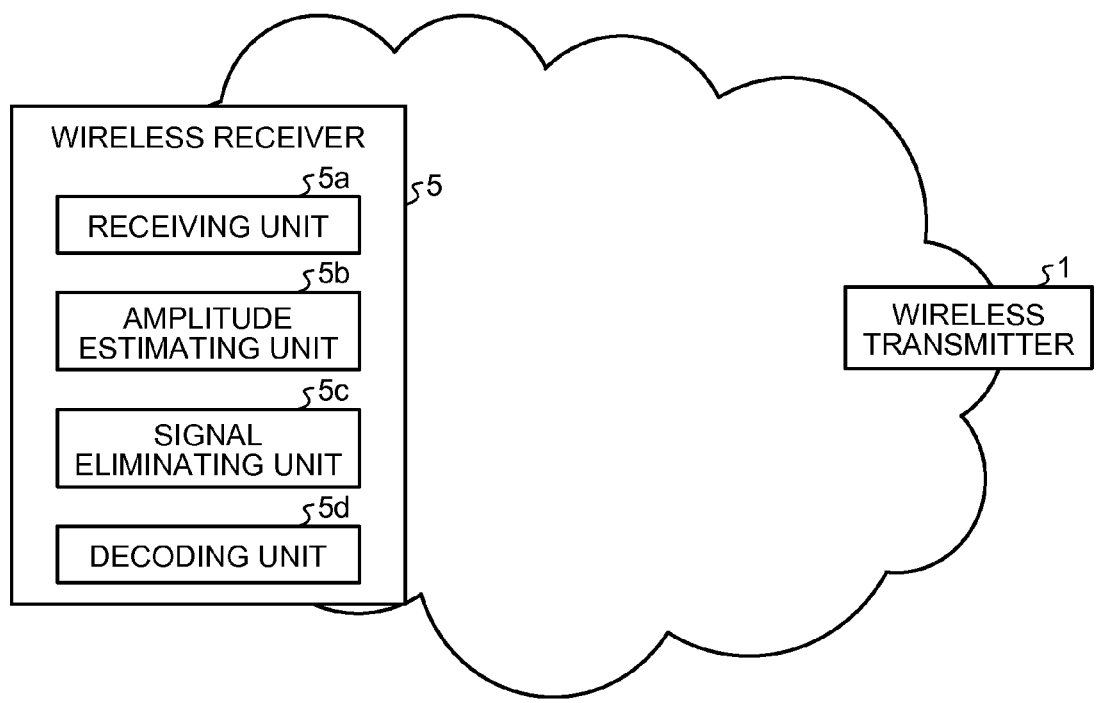
FIG. 1 is an exemplary schematic diagram of an overall configuration of a system including a wireless receiver according to a first embodiment of the present invention.

FIG. 1 is an exemplary schematic diagram of an overall configuration of a system including a wireless receiver according to the first embodiment. As illustrated in FIG. 1, the system includes a wireless transmitter 1 and a wireless receiver 5 that are communicatably interconnected by the implementation of, for example, a communication method using the CDMA technology such as the W-CDMA technology.

The wireless transmitter 1 is an apparatus such as a wireless base station that performs wireless communication with the wireless receiver 5. The wireless transmitter 1 performs multiplexing of control signals or communication data such as voice data and then transmits the multiplexed data to the wireless receiver 5. For example, the wireless transmitter 1 performs multiplexing of control signals, such as a pilot signal (CPICH: common pilot channel) in which a single frame has a length of 10 msec and includes 15 slots or a synchronization signal (SCH: synchronization channel), and communication data, such as voice data, and then transmits the multiplexed data to the wireless receiver 5.

For example, the wireless transmitter 1 makes use of a modulation method such as binary phase shift keying (BPSK), quadrature phase shift keying (QPSK), or quadrature amplitude modulation (QAM) for performing modulation of control signals such as the pilot signal and modulation of communication data. Then, the wireless transmitter 1 carries out spreading of each modulated signal by making use of an orthogonal code (CC: channelization code) and a scrambling code (SC), adds a synchronization signal to the spread signals and performs multiplexing thereof, and then transmits the multiplexed signals to the wireless receiver 5.

The wireless receiver 5 is a wireless communication apparatus such as a mobile terminal that decodes desired signals by carrying out despreading and demodulation with respect to the signals received from the wireless transmitter 1. Particularly, the wireless receiver 5 includes a receiving unit 5a, an amplitude estimating unit 5b, a signal eliminating unit 5c, and a decoding unit 5d.

The receiving unit 5a receives a signal obtained by multiplexing a plurality of signals, which include a synchronization signal that is spread using a non-orthogonal code not orthogonal to the code for spreading signals other than the synchronization signal. For example, from the wireless transmitter 1, the receiving unit 5a receives a signal obtained by multiplexing communication data, which is modulated using the abovementioned modulation method and spread using the orthogonal code and the scrambling code, and an SCH, which is spread using the non-orthogonal code.

The amplitude estimating unit 5b performs, in the case of decoding the signals other than the synchronization signal, despreading with respect to the signals received by the receiving unit 5a with the synchronization signal and estimates the signal amplitude of the non-orthogonal code. For example, in the case of decoding communication data such as voice data that represents signals other than the SCH, the amplitude estimating unit 5b performs despreading with respect to the signals received by the receiving unit 5a with known SCH complex conjugate. Consequently, the amplitude estimating unit 5b calculates the signal amplitude (complex conjugate) of the non-orthogonal code that had been used by the wireless transmitter 1 for SCH spreading.

Using the signal amplitude of the non-orthogonal code estimated by the amplitude estimating unit 5b and using the SCH, the signal eliminating unit 5c eliminates the spread SCH from the signals received by the receiving unit 5a. For example, the signal eliminating unit 5c multiplies known SCH code to the signal amplitude of the non-orthogonal code estimated by the amplitude estimating unit 5b and estimates an SCH that is in a condition identical to the condition when received from the wireless transmitter 1 in spread form using the non-orthogonal code. Then, the signal eliminating unit 5c eliminates the estimated SCH from the signals received by the receiving unit 5a.

The decoding unit 5d performs despreading and demodulation with respect to the signals from which the spread SCH has been eliminated by the signal eliminating unit 5c, and decodes the target signals for decoding. For example, using the scrambling code, the decoding unit 5d performs descrambling with respect to the received signals from which the spread SCH has been eliminated. Subsequently, using a target orthogonal code for decoding, the decoding unit 5d performs despreading with respect to the despread signals. Then, the decoding unit 5d performs demodulation and error correction for decoding the target signals for decoding.

Sequence of Operations

Figure 2:
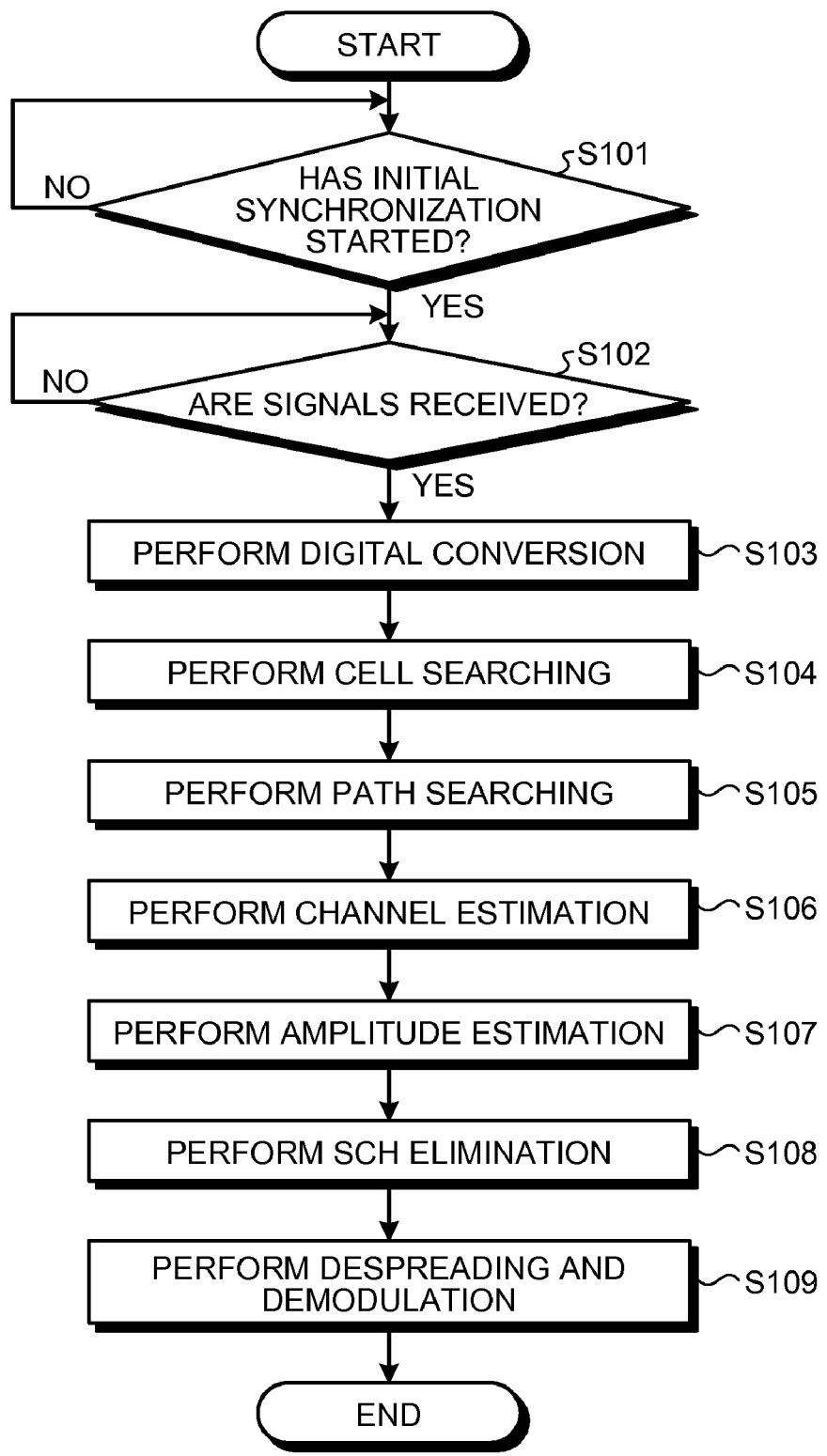
FIG. 2 is an exemplary flowchart for explaining the sequence of operations performed by the wireless receiver according to the first embodiment.

Explained below with reference to FIG. 2 is the sequence of operations performed by the wireless receiver according to the first embodiment. FIG. 2 is an exemplary flowchart for explaining the sequence of operations performed by the wireless receiver according to the first embodiment.

As illustrated in FIG. 2, when initial synchronization gets underway (Yes at Step S101), the wireless receiver 5 receives signals from the wireless transmitter 1 (Step S102). Herein, initial synchronization is performed when the power of a mobile terminal installed with the wireless receiver 5 is turned ON or when path searching or cell searching ends.

Upon receiving signals from the wireless transmitter 1 (Yes at Step S102), the wireless receiver 5 converts the received signals into digital signals (Step S103). Subsequently, the wireless receiver 5 detects the timing of the SCH by performing cell searching, detects the scrambling code included in the received signals, and detects the frame timing (Step S104).

Then, the wireless receiver 5 performs path searching and calculates a delay time for each path in a multipath transmission environment and detects the detailed timing for each path, that is, detects the timing of despreading in each path (Step S105).

Subsequently, using the scrambling code and the orthogonal code, the wireless receiver 5 performs despreading with respect to the pilot signal included in the received signals and calculates a channel estimate value (Step S106). More particularly, the wireless receiver 5 makes use of the detailed timing for each path calculated at Step s105 and calculates a channel estimate value for each path.

Then, in the case of decoding the signals other than the SCH, the wireless receiver 5 performs despreading with respect to the signals received by the receiving unit 5a using the known SCH code and calculates the signal amplitude of the non-orthogonal code (Step S107). Subsequently, using the estimated signal amplitude of the non-orthogonal code and the known SCH code, the wireless receiver 5 eliminates the SCH code from the signals received by the receiving unit 5a (Step S108).

Eventually, the wireless receiver 5 performs despreading and demodulation with respect to the signals from which the SCH signal has been eliminated and decodes the target signals for decoding by multiplying the demodulated signals with the channel estimate values (Step S109). At that time, the wireless receiver 5 synthesizes the signals corresponding to all timings using the channel estimate value for each path in a multipath transmission environment.

Effect of First Embodiment

In this way, according to the first embodiment, in the case of decoding desired signals from among the received signals that include an SCH spread using the orthogonal code; the complex conjugate of the SCH is estimated by making use of known SCH code. That estimated value is then used in estimated calculation of the SCH signal and the SCH signal calculated thereat is eliminated from the received signals. That is to say, since it is possible to estimate the SCH and then eliminate the estimated SCH from the received signals, the interference from the SCH can be accurately eliminated at the time of decoding signals other than the SCH.

[b] Second Embodiment

Meanwhile, the wireless transmitter and the wireless receiver according to the first embodiment can also include various control units other than the control units explained in the first embodiment. Thus, the description for a second embodiment of the present invention includes the description of a wireless transmitter and a wireless receiver that include various control units other than the control units explained in the first embodiment.

Configuration of Wireless Transmitter

Figure 3:
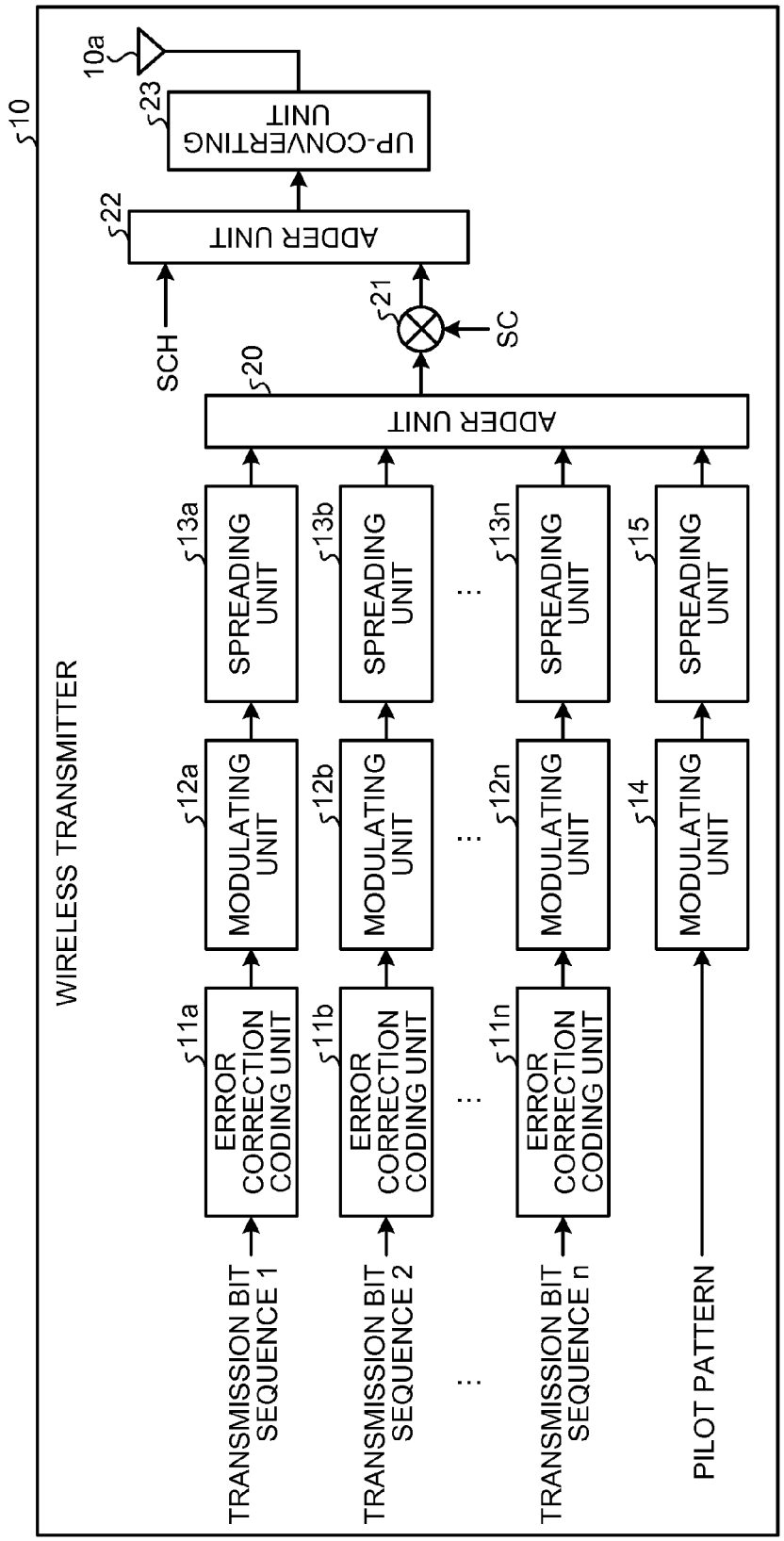
FIG. 3 is an exemplary block diagram of a configuration of a wireless transmitter according to a second embodiment of the present invention.

Firstly, explained below with reference to FIG. 3 is a configuration of a wireless transmitter according to the second embodiment. FIG. 3 is an exemplary block diagram of a configuration of a wireless transmitter according to the second embodiment.

As illustrated in FIG. 3, a wireless transmitter 10 includes an antenna 10a, error correction coding units 11a to 11n, modulating units 12a to 12n, spreading units 13a to 13n, a modulating unit 14, and a spreading unit 15. In addition, the wireless transmitter 10 includes an adder unit 20, a multiplier unit 21, an adder unit 22, and an up-converting unit 23. The antenna 10a transmits, to a wireless receiver 50, data that is obtained by, for example, multiplexing control signals, such as a pilot signal and an SCH, and data, such as voice data or electronic mails.

The error correction coding units 11a to 11n append a redundant bit for performing error detection/correction, such as forward error correction (FEC), to transmission bit sequences 1 to n, respectively, and then output the generated transmission bit sequences to the modulating units 12a to 12n, respectively.

The modulating units 12a to 12n implement a modulation method such as BPSK, QPSK, or QAM for performing modulation of the transmission bit sequences output by the error correction coding units 11a to 11n, respectively, and output the modulated data to the spreading units 13a to 13n, respectively. Then, using orthogonal codes unique to the channels, the spreading units 13a to 13n perform spreading with respect to the transmission data output by the modulating units 12a to 12n, respectively, and output the spread data to the adder unit 20.

The modulating unit 14 modulates the pilot signal (pilot channel) as the transmission target without appending thereto a redundant bit as is the case for the other transmission bits and then outputs the modulated pilot signal to the spreading unit 15. Subsequently, the spreading unit 15 performs spreading with respect to the modulated pilot signal using an orthogonal code and outputs the spread pilot signal to the adder unit 20.

The adder unit 20 adds the transmission bit sequences spread by the spreading units 13a to 13n and the pilot signal spread by the spreading unit 15, and outputs the added signal to the multiplier unit 21. Then, with respect to the added signal output by the adder unit 20, the multiplier unit 21 performs scrambling by performing complex multiplication of a scrambling code that is unique to the base station and that has the cycle equivalent to a single frame. That is, with respect to the added signal output by the adder unit 20, the multiplier unit 21 performs scrambling by performing complex multiplication of the scrambling code unique to the wireless transmitter 10 and then outputs the scrambled transmission data to the adder unit 22.

To the transmission data scrambled by the multiplier unit 21, the adder unit 22 adds the SCH code that is a known synchronization code common between the wireless transmitter 10 and the wireless receiver 50, and outputs the addition result to the up-converting unit 23. Subsequently, the up-converting unit 23 up-converts the transmission data, with the known SCH code added thereto by the adder unit 22, to radio frequency. That is, the up-converting unit 23 up-converts the data to be transmitted to the wireless receiver 50 to radio frequency and outputs the up-converted transmission data to the antenna 10a. Eventually, the antenna 10a transmits the up-converted transmission data to the wireless receiver 50.

Configuration of Wireless Receiver

Figure 4:
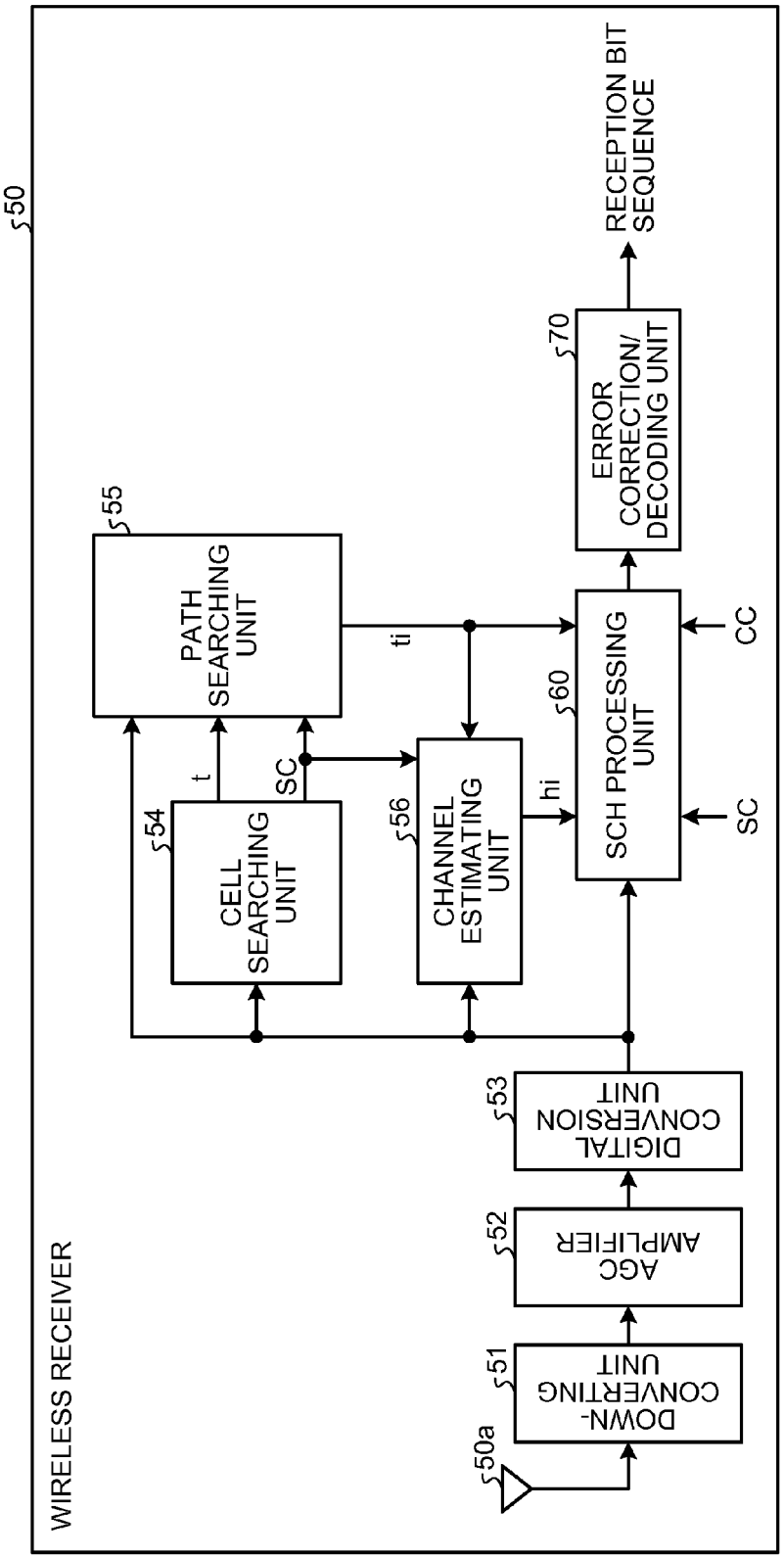
FIG. 4 is an exemplary block diagram of a configuration of a wireless receiver according to the second embodiment.

Explained below with reference to FIG. 4 is a configuration of a wireless receiver according to the second embodiment. FIG. 4 is an exemplary block diagram of a configuration of a wireless receiver according to the second embodiment.

As illustrated in FIG. 4, the wireless receiver 50 includes an antenna 50a, a down-converting unit 51, an automatic gain control (AGC) amplifier 52, a digital conversion unit 53, a cell searching unit 54, a path searching unit 55, a channel estimating unit 56, an SCH processing unit 60, and an error correction/decoding unit 70.

The antenna 50a receives a radio-frequency signal that is output by the wireless transmitter 10 and that is obtained by multiplexing a plurality of signals including an SCH that is spread using a non-orthogonal code not orthogonal to the code for spreading signals other than the SCH. The down-converting unit 51 down-converts the radio-frequency signal received via the antenna 50a to a baseband and outputs that baseband to the AGC amplifier 52.

If fluctuation occurs in the amplitude of the signals input thereto, the AGC amplifier 52 automatically adjusts the gain of an inbuilt amplifying circuit and outputs stable signals to the digital conversion unit 53. Then, the digital conversion unit 53 converts the signals output by the AGC amplifier 52 into digital signals and outputs them to each of the cell searching unit 54, the channel estimating unit 56, and the SCH processing unit 60.

The cell searching unit 54 performs what is called a three-step cell search and, in order to establish synchronization with the wireless transmitter 10, detects a frame timing (t) or detects the scrambling code that is unique to the wireless transmitter 10 and that has the cycle equivalent to a single frame. For example, the cell searching unit 54 establishes synchronization by receiving the primary-synchronization channel (P-SCH) included in the SCH and obtains the timing of the secondary-synchronization channel (S-SCH).

Subsequently, the cell searching unit 54 receives the S-SCH at the timing obtained from the P-SCH and obtains the header position of the scrambling code, that is, obtains the frame timing (t) from the code of the S-SCH. Moreover, the cell searching unit 54 identifies the code group of the scrambling code from the patterns of S-SCH codes assigned to the 15 slots in a single frame. Then, the cell searching unit 54 receives the CPICH, calculates a correlation between the received CPICH and each scrambling code included in the identified code group of the scrambling code, and specifies the scrambling code having the highest correlation to be the scrambling code of the cell or the sector at which the wireless transmitter 10 is located. The cell searching unit 54 then outputs the identified frame timing (t) and the scrambling code unique to the wireless transmitter 10 to the path searching unit 55 and outputs the scrambling code to the channel estimating unit 56.

The path searching unit 55 detects a timing for performing despreading with respect to the received signals transmitted by the wireless transmitter 10 in a multipath transmission environment. For example, the path searching unit 55 detects a detailed timing (ti) for each path using the scrambling code and the frame timing (t) detected by the cell searching unit 54 and then outputs the detailed timings (ti) to the channel estimating unit 56 and the SCH processing unit 60. Meanwhile, herein, "i" represents the number of paths and lies in the range of 0 to n−1 (where, n is a natural number).

For each path from among the multiple paths, the channel estimating unit 56 calculates a channel estimate value that indicates the phase and the amplitude of that path. For example, with respect to the pilot channel included in the received signals, the channel estimating unit 56 performs descrambling at the corresponding timing (ti) and using the scrambling code detected by the path searching unit 55. Subsequently, with respect to the signal descrambled using the scrambling code, the channel estimating unit 56 performs further despreading using the channelization code (CC) of the target signals for decoding, calculates a channel estimate value (hi) of each path by carrying out an averaging procedure, and outputs the channel estimate values (hi) to the SCH processing unit 60. Meanwhile, herein, "i" represents the number of paths and lies in the range of 0 to n−1 (where, n is a natural number).

Figure 5:
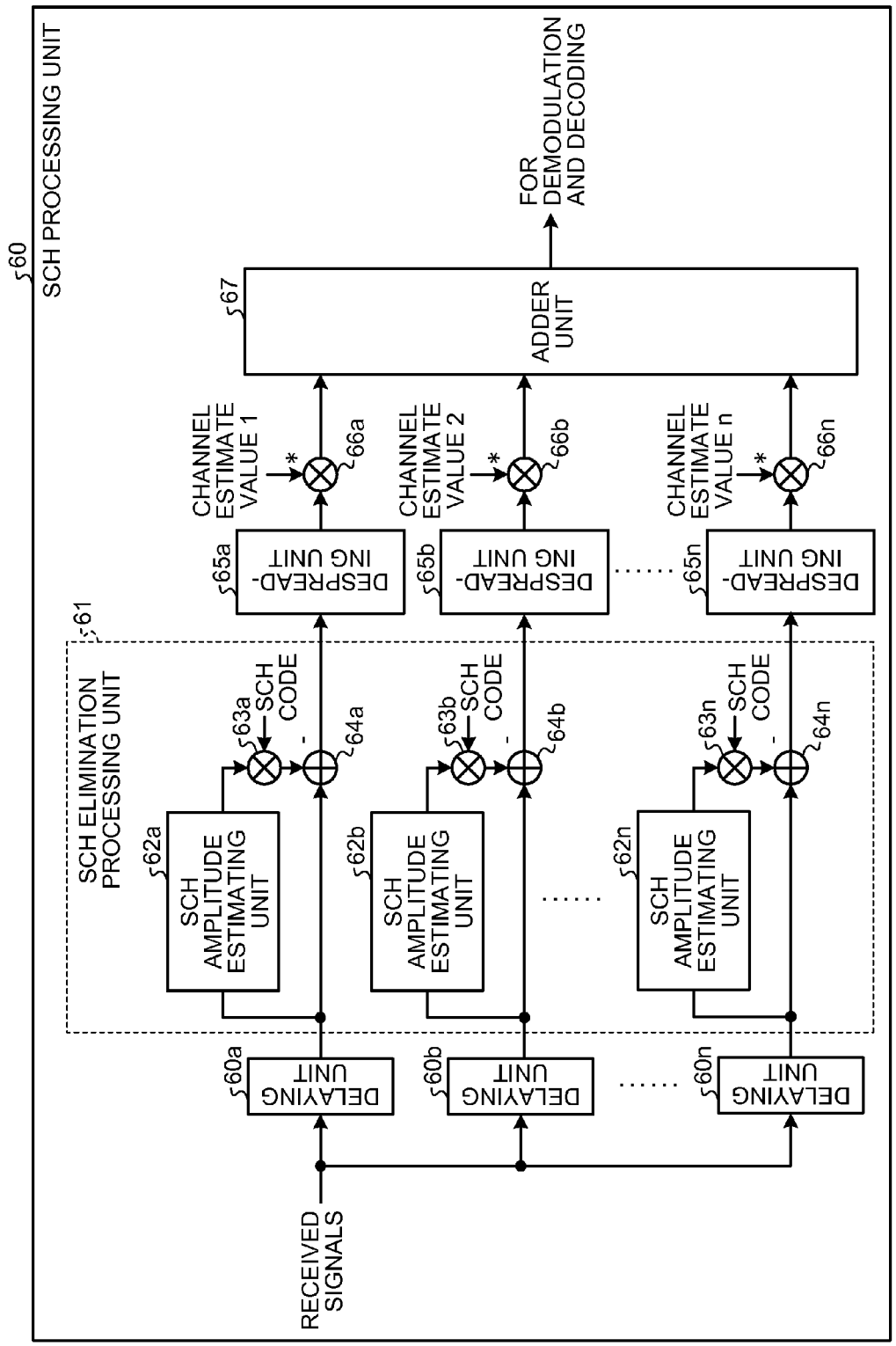
FIG. 5 is an exemplary block diagram of a detailed configuration of an SCH processing unit according to the second embodiment.

The SCH processing unit 60 eliminates the SCH from the received signals and decodes desired signals by performing despreading using the scrambling code and the channelization code. As illustrated in FIG. 5, the SCH processing unit 60 includes delaying units 60a to 60n, an SCH elimination processing unit 61, despreading units 65a to 65n, multiplier units 66a to 66n, and an adder unit 67. The SCH processing unit 60 performs various operations with the use of these constituent elements. Herein, FIG. 5 is an exemplary block diagram of a detailed configuration of the SCH processing unit 60.

The delaying units 60a to 60n delay the received signals that are delay waves input to each path and converted into a digital form, detects the multiplexed signals, and outputs those signals to the SCH elimination processing unit 61. In the case of decoding signals other than the SCH, the SCH elimination processing unit 61 eliminates the SCH from the received signals. Particularly, the SCH elimination processing unit 61 includes SCH amplitude estimating units 62a to 62n, multiplier units 63a to 63n, and eliminating units 64a to 64n.

For each path from among the multiple paths, the SCH amplitude estimating units 62a to 62n estimate the signal amplitude (complex conjugate) of the non-orthogonal code that had been used for the SCH signal included in the received signals and output the signal amplitude to the multiplier units 63a to 63n, respectively. For example, with respect to each chip of the received signals output by the delaying units 60a to 60n, the SCH amplitude estimating units 62a to 62n perform despreading using the known complex conjugate of the SCH code. Then, the SCH amplitude estimating units 62a to 62n add up the signal amplitudes obtained by despreading on a chip-by-chip basis, calculate the signal amplitude of the non-orthogonal code used for SCH signal included in the received signals, and outputs that signal amplitude to the multiplier units 63a to 63n.

Using the non-orthogonal codes estimated by the SCH amplitude estimating units 62a to 62n, respectively, and using the known SCH codes; the multiplier units 63a to 63n multiply the estimated amplitude and the SCH code for each path. For example, the multiplier units 63a to 63n multiply the known SCH codes by the non-orthogonal codes output by the SCH amplitude estimating units 62a to 62n, respectively, for generating the SCH replica and output them to the eliminating units 64a to 64n. In other words, the multiplier units 63a to 63n estimate the signals in the condition in which the SCH is spread using the non-orthogonal codes, that is, estimate the SCH signal included in the received signals.

For each path, the eliminating units 64a to 64n eliminate, from the received signals, the SCH calculated by the multiplier units 63a to 63n and output the received signals having the SCH signal eliminated therefrom to the despreading units 65a to 65n, respectively.

For each path, the despreading units 65a to 65n perform despreading using the scrambling code and the channelization code. For example, with respect to the signals output by the eliminating units 64a to 64n, respectively; the despreading units 65a to 65n perform descrambling using the scrambling code detected by the cell searching unit 54. Then, with respect to the signals subjected to descrambling using the scrambling code, the despreading units 65a to 65n perform further despreading using the channelization code of the target signals for decoding, that is, using the channelization code assigned to themselves and output the post-despreading signals to the multiplier units 66a to 66n, respectively.

With respect to the received signals of each path, the multiplier units 66a to 66n multiply the phase and the amplitude of that path. For example, with respect to the signals output by the despreading units 65a to 65n, respectively; the multiplier units 66a to 66n multiply the channel estimate value (hi) calculated for each path by the channel estimating unit 56 and output the result to the adder unit 67. Then, the adder unit 67 synthesizes the signals output on a path-by-path basis by the multiplier units 66a to 66n and outputs the synthesized signal to the error correction/decoding unit 70.

Returning to the explanation with reference to FIG. 4, the error correction/decoding unit 70 performs error correction and demodulation with respect to the synthesized signal and decodes the target signals for decoding. For example, the error correction/decoding unit 70 performs error correction using the redundant bit included in the signal that is obtained by synthesizing the signals for each path and that is output by the adder unit 67. Moreover, by performing demodulation with the modulation method implemented for modulation by the wireless transmitter 10, the error correction/decoding unit 70 extracts the received bit sequences and decodes the target signals for decoding.

Effect of Second Embodiment

In this way, according to the second embodiment, the SCH that collapses once despreading is performed using the scrambling code and the channelization code can be eliminated before performing despreading. As a result, in the case of decoding signals other than the SCH, the interference from the SCH can be accurately eliminated. Moreover, since the SCH can be eliminated for each path from among the multiple paths, a high SCH elimination accuracy is can also be achieved.

[c] Third Embodiment

In the second embodiment, the description is given for an exemplary wireless receiver that eliminates the SCH for each path from among the multiple paths. However, the wireless receiver disclosed in the present invention is not limited to that case. For example, even in a case when signals transmitted in a multipath transmission environment are not received via multiple paths but received via a single path, it is still possible to accurately eliminate the interference from the SCH in an identical manner to that according to the second embodiment. Thus, in a third embodiment of the present invention described below, an example is given with reference to FIG. 6 for accurately eliminating the SCH when signals transmitted in a multipath transmission environment are received via a single path.

Figure 6:
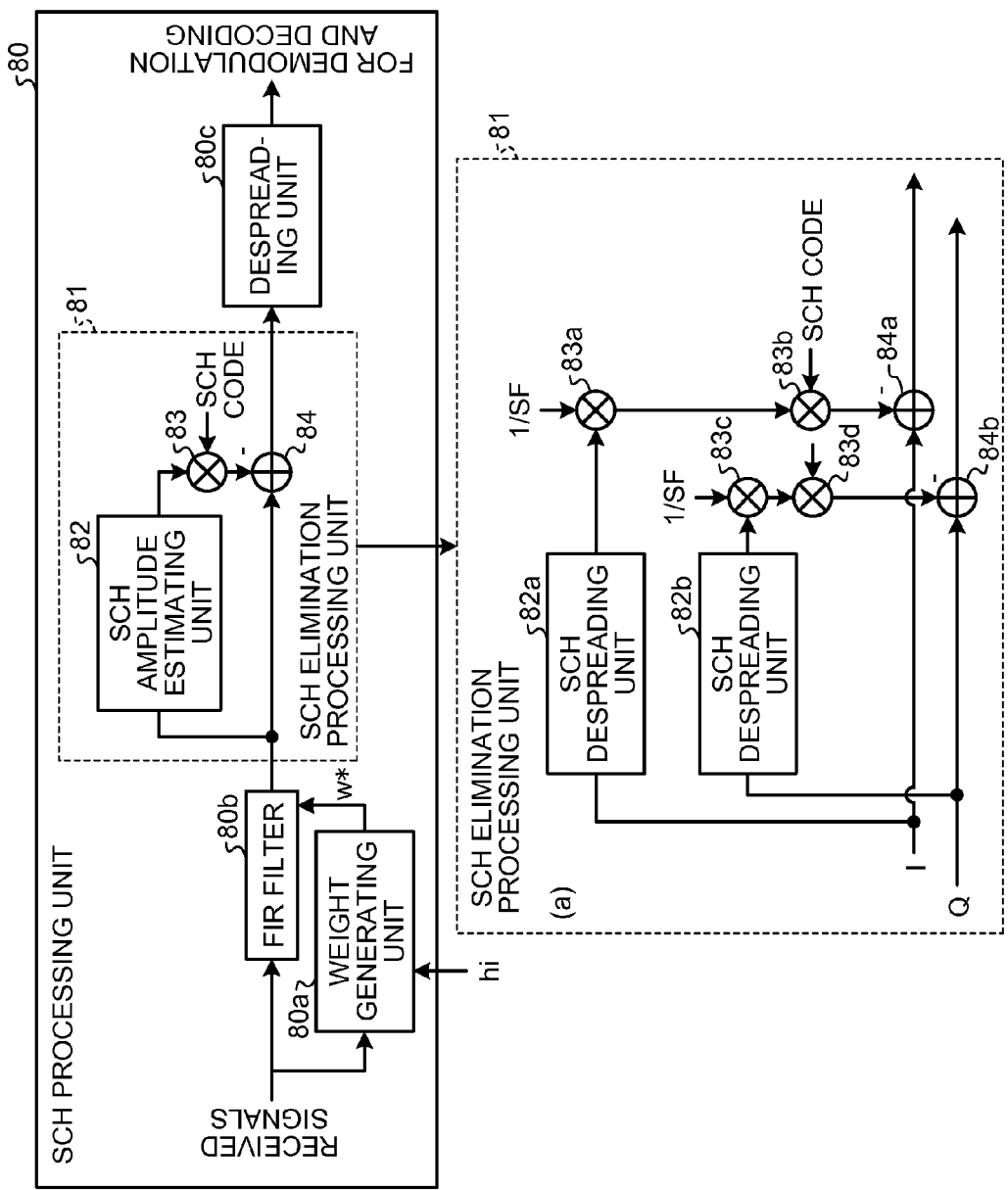
FIG. 6 is an exemplary block diagram of a configuration of an SCH processing unit in a wireless receiver according to a third embodiment of the present invention.

FIG. 6 is an exemplary block diagram of a configuration of an SCH processing unit in a wireless receiver according to the third embodiment. Herein, apart from the configuration of the SCH processing unit, the wireless receiver according to the third embodiment has the same configuration as that described in the second embodiment. Hence, the following description is given only for the configuration of the SCH processing unit that has a different configuration than in the second embodiment.

As illustrated in FIG. 6, an SCH processing unit 80 includes a weight generating unit 80a, a finite impulse response (FIR) filter 80b, an SCH elimination processing unit 81, and a despreading unit 80c.

Figure 7:
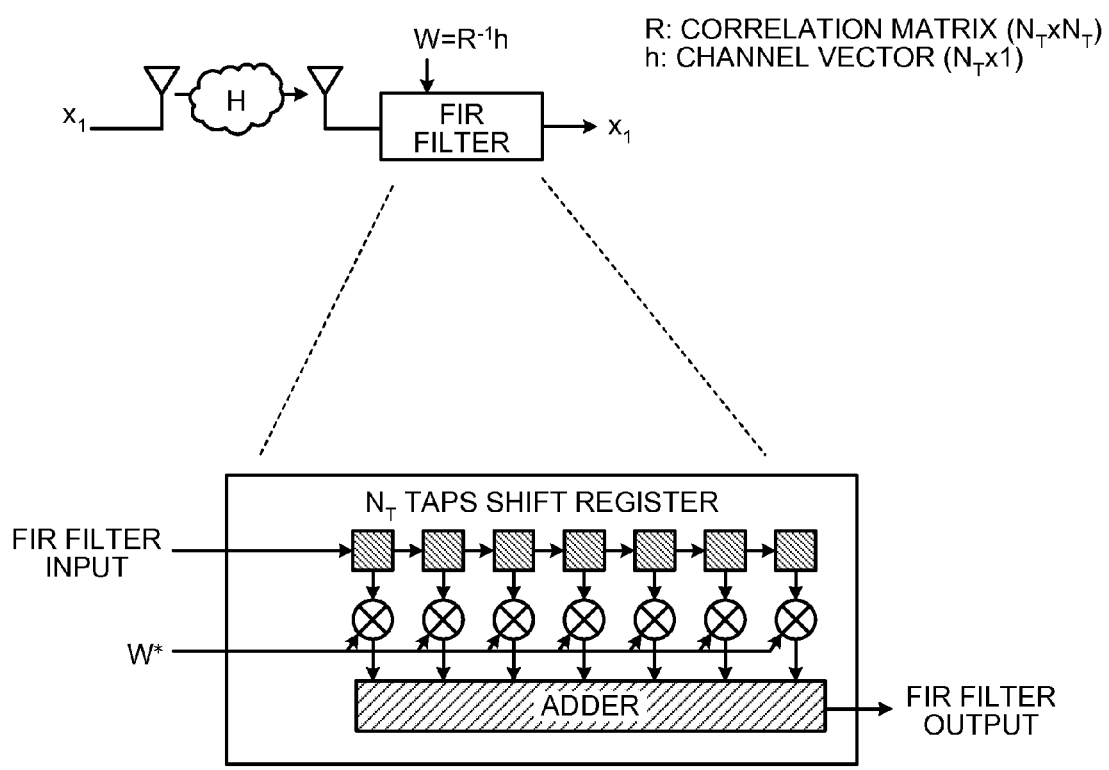
FIG. 7 is an explanatory diagram for explaining the weight to be input to an FIR filter according to the third embodiment.

The weight generating unit 80a generates a weight vector (W) to be input to an FIR filter by making use of the channel estimate value (hi: channel vector) calculated for each path from among multiple paths by the channel estimating unit 56. For example, as illustrated in FIG. 7, for a correlation matrix R and a channel estimate value h regarding N number of taps in the FIR filter 80b; the weight generating unit 80a calculates a weight vector as $W=R^{-1} \times h$. Then, the weight generating unit 80a inputs the calculated weight vector ($W=R^{-1} \times h$) to the FIR filter 80b. Herein, FIG. 7 is an explanatory diagram for explaining the weight to be input to an FIR filter.

The FIR filter 80b is an apparatus such as an equalizer for equalizing the digital signals obtained by conversion by the digital conversion unit 53. For example, as illustrated in FIG. 7, to each signal that has been made to pass through shift registers (delay elements) corresponding to the number of taps; the FIR filter 80b multiplies the complex conjugate of the weight vector ($W=R^{-1} \times h$) input by the weight generating unit 80a. Then, the FIR filter 80b adds up the signals that have been multiplied with the complex conjugate of the weight vector (W) and outputs the addition result to the SCH elimination processing unit 81.

In the case of decoding signals other than the SCH, the SCH elimination processing unit 81 eliminates the SCH from the received signals. Particularly, the SCH elimination processing unit 81 includes an SCH amplitude estimating unit 82, a multiplier unit 83 and an eliminating unit 84.

The SCH amplitude estimating unit 82 uses the SCH for performing despreading with respect to the signals equalized by the FIR filter 80b and estimates the signal amplitude of the non-orthogonal code. For example, with respect to the signals equalized by the FIR filter 80b, the SCH amplitude estimating unit 82 performs despreading using the known complex conjugate of the SCH code. Then, the SCH amplitude estimating unit 82 adds up the signal amplitudes obtained by despreading on a chip-by-chip basis, calculates the signal amplitude of the non-orthogonal code used for the SCH signal included in the received signals, and outputs that signal amplitude to the multiplier unit 83.

Using the non-orthogonal code estimated by the SCH amplitude estimating unit 82 and using the known SCH code, the multiplier unit 83 estimates the SCH signal included in the received signals. For example, the multiplier unit 83 multiplies the known SCH code to the signal amplitude of the non-orthogonal code for generating, as estimation, the SCH signal and then outputs that SCH signal to the eliminating unit 84. In other words, the multiplier unit 83 estimates the signals in the condition in which the SCH is spread using the non-orthogonal code. That is, the multiplier unit 83 estimates the SCH signal included in the received signals.

For each path, the eliminating unit 84 eliminates, from the signals equalized by the FIR filter 80b, the SCH calculated by the multiplier unit 83 and outputs the received signals having the SCH signal eliminated therefrom to the despreading unit 80c.

Given below with reference to (a) in FIG. 6 is the detailed explanation of the SCH elimination processing unit 81. In reality, the SCH is a complex signal. For example, the SCH in the W-CDMA technology is a signal equivalent to BPSK. For that reason, the real part (I axis, in-phase components) as well as the imaginary part (Q axis, orthogonal components) of the received signals includes the same SCH. Hence, as illustrated in (a) in FIG. 6, the signal amplitude of the non-orthogonal code is independently estimated for the real part and for the imaginary part.

More particularly, on the I axis, an SCH despreading unit 82a makes use of the SCH code (as BPSK, the SCH code is also a real number) for performing despreading with respect to the signals equalized by the FIR filter 80b and estimates the signal amplitude of the non-orthogonal code. Then, a multiplier unit 83a multiplies 1/SF to the estimated signal amplitude. Subsequently, to the signal amplitude of the non-orthogonal code output by the multiplier unit 83a, a multiplier unit 83b multiplies the known SCH code and generates, as estimation, the SCH signal. An eliminating unit 84a then eliminates, from the received signal, the SCH code calculated by the multiplier unit 83b and outputs the received signals having the SCH signal eliminated therefrom to the despreading unit 80c. Meanwhile, herein, "SF" represents a spreading factor that is equal to 256 for the SCH in the W-CDMA technology.

In an identical manner, on the Q axis, an SCH despreading unit 82b makes use of the SCH code for performing despreading with respect to the signals equalized by the FIR filter 80b and estimates the signal amplitude of the non-orthogonal code. Then, a multiplier unit 83c multiplies 1/SF to the estimated signal amplitude. Subsequently, a multiplier unit 83d multiplies the known SCH code to the signal amplitude of the non-orthogonal code output by the multiplier unit 83c. An eliminating unit 84b then eliminates, from the received signal, the SCH code calculated by the multiplier unit 83d and outputs the received signals having the SCH signal eliminated therefrom to the despreading unit 80c.

Returning to the explanation with reference to FIG. 6, the despreading unit 80c uses the scrambling code and the channelization code for performing despreading with respect to the received signals having the SCH signal eliminated therefrom. For example, with respect to the signals output by the eliminating unit 84, that is, from the eliminating unit 84a or the eliminating unit 84b; the despreading unit 80c performs descrambling using the scrambling code detected by the cell searching unit 54. Moreover, with respect to the signals subjected to descrambling using the scrambling code, the despreading unit 80c performs despreading using the channelization code of the target signals for decoding, that is, using the channelization code assigned to itself, and outputs the post-despreading signals to the error correction/decoding unit 70. Subsequently, in an identical manner to the second embodiment, the error correction/decoding unit 70 performs error correction and demodulation with respect to the signals output by the despreading unit 80c and decodes the target signals for decoding.

In this way, according to the third embodiment, SCH elimination can be performed with the circuit scale or with the complexity corresponding to a single path. Hence, as compared to the case of eliminating the SCH for each path as described in the second embodiment, it becomes possible to scale down the circuit scale and to reduce the complexity. Moreover, since it is possible use the phase and the signal amplitude of the post-equalization SCH that is output by an FIR filter, the estimation accuracy of the SCH complex conjugate can be enhanced and thus the SCH can be eliminated with more accuracy.

[d] Fourth Embodiment

Figure 8:
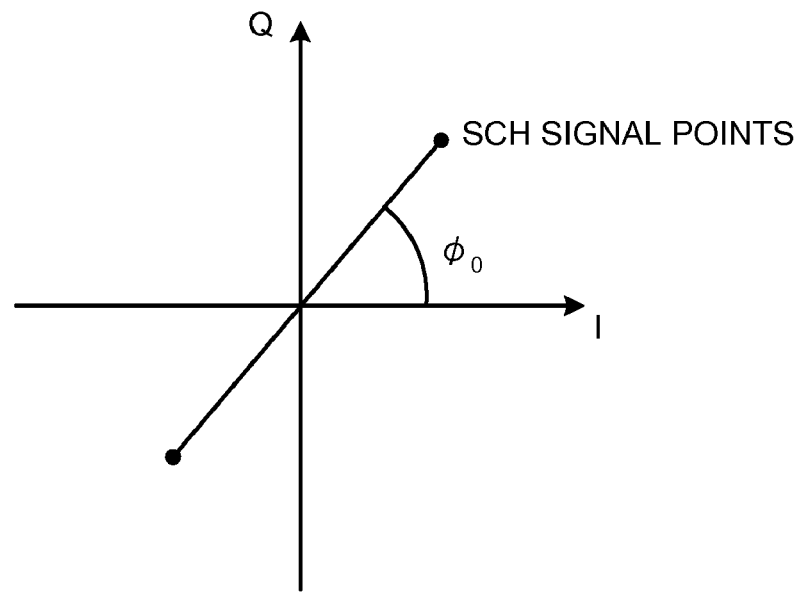
FIG. 8 is an explanatory diagram for explaining the phase of the SCH according to the third embodiment.
Figure 9:
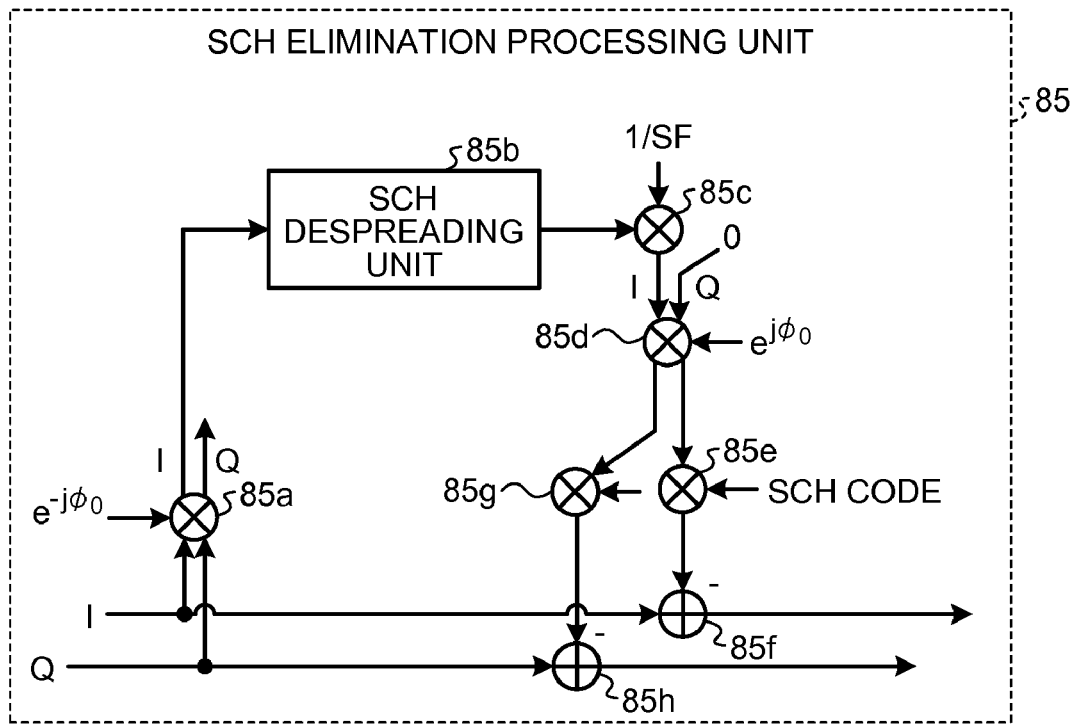
FIG. 9 is an exemplary block diagram of a configuration of an SCH elimination processing unit in a wireless receiver according to a fourth embodiment of the present invention.

Meanwhile, in the case of signal transmission in a multi-path transmission environment as described in the third embodiment, the complexity regarding SCH elimination can be further reduced if the phase of the SCH is known. Therefore, in a fourth embodiment of the present invention described below, an example is given with reference to FIGS. 8 and 9 for eliminating the SCH when the phase of the SCH is known. FIG. 8 is an explanatory diagram for explaining the phase of the SCH and FIG. 9 is an exemplary block diagram of a configuration of an SCH elimination processing unit in a wireless receiver according to the fourth embodiment.

Herein, apart from the SCH elimination processing unit, the other processing units are identical to those described in the third embodiment. Hence, the description of the other processing units is not repeated.

More particularly, the post-equalization signal points either are almost identical to the transmission signals or are rotated by a particular angle. Thus, the SCH transmitted by the wireless transmitter 10 also has the phase equal to a fixed value. At that time, estimating the amplitude of the SCH after rotation by only a certain phase, that is, estimating the amplitude of the non-orthogonal code renders amplitude estimation on the Q side unnecessary. That enables achieving reduction in the complexity.

For example, as illustrated in FIG. 8, it is assumed that the SCH of the transmitted signals as well as the SCH of the received signals has a phase "$\phi_0$". In that case, as illustrated in FIG. 9, a multiplier unit 85a in an SCH elimination processing unit 85 according to the fourth embodiment multiplies "$e^{-j\phi_0}$" to the signals equalized by the FIR filter 80b, rotates the phase of the received signals by "$\phi_0$", and shifts the phase to the signal points on the I axis. Then, an SCH despreading unit 85b uses the known SCH code for performing despreading with respect to the signals having the phase rotated by the multiplier unit 85a and estimates the signal amplitude of the non-orthogonal code. Herein, the details of the estimation method are identical to the details described in the third embodiment.

Subsequently, a multiplier unit 85c multiplies 1/SF to the estimated signal amplitude. Subsequently, a multiplier unit 85d multiplies "$e^{j\phi_0}$" to the signals output by the multiplier unit 85c, performs inverse rotation of the rotated phase by "$\phi_0$", and returns the phase to the phase of the original signal points. Subsequently, a multiplier unit 85e multiplies the known SCH code to the signals output by the multiplier unit 85d. Then, an eliminating unit 85f eliminates the SCH calculated by the multiplier unit 85e from the signals equalized by the FIR filter 80b and outputs the received signals having the SCH signal eliminated therefrom to the despreading unit 80c. In other words, the eliminating unit 85f eliminates the SCH on the I axis.

Similarly, a multiplier unit 85g multiplies the known SCH code to the signals output by the multiplier unit 85d. Then, an eliminating unit 85h eliminates the SCH calculated by the multiplier unit 85g from the signals equalized by the FIR filter 80b and outputs the received signals having the SCH signal eliminated therefrom to the despreading unit 80c. In other words, the eliminating unit 85h eliminates the SCH on the Q axis.

In this way, according to the fourth embodiment, the complexity can be reduced since there is no need to perform amplitude estimation on the Q side. Moreover, since the phase is fixed, the estimate value of the amplitude also improves thereby enabling SCH elimination with more accuracy. Meanwhile, even if the SCH is not modulated with BPSK but is modulated with QPSK or 16QAM, the same operation can be performed.

[e] Fifth Embodiment

In the first four embodiments, the explanation is given for a case of transmitting signals from a single antenna of a wireless transmitter. However, even if a wireless transmitter transmits signals using a plurality of antennas, the SCH can be accurately eliminated in an identical manner to the first four embodiments. In a fifth embodiment of the present invention described below, the explanation is given with reference to FIG. 10 about a case of transmission diversity (TxDiv) in which a wireless transmitter transmits signals using two antennas and a wireless receiver receives signals using a single antenna. Herein, since the signals are transmitted via two antennas, the wireless receiver is configured to include two FIR filters. However, the number of FIR filters is not limited to two.

Figure 10:
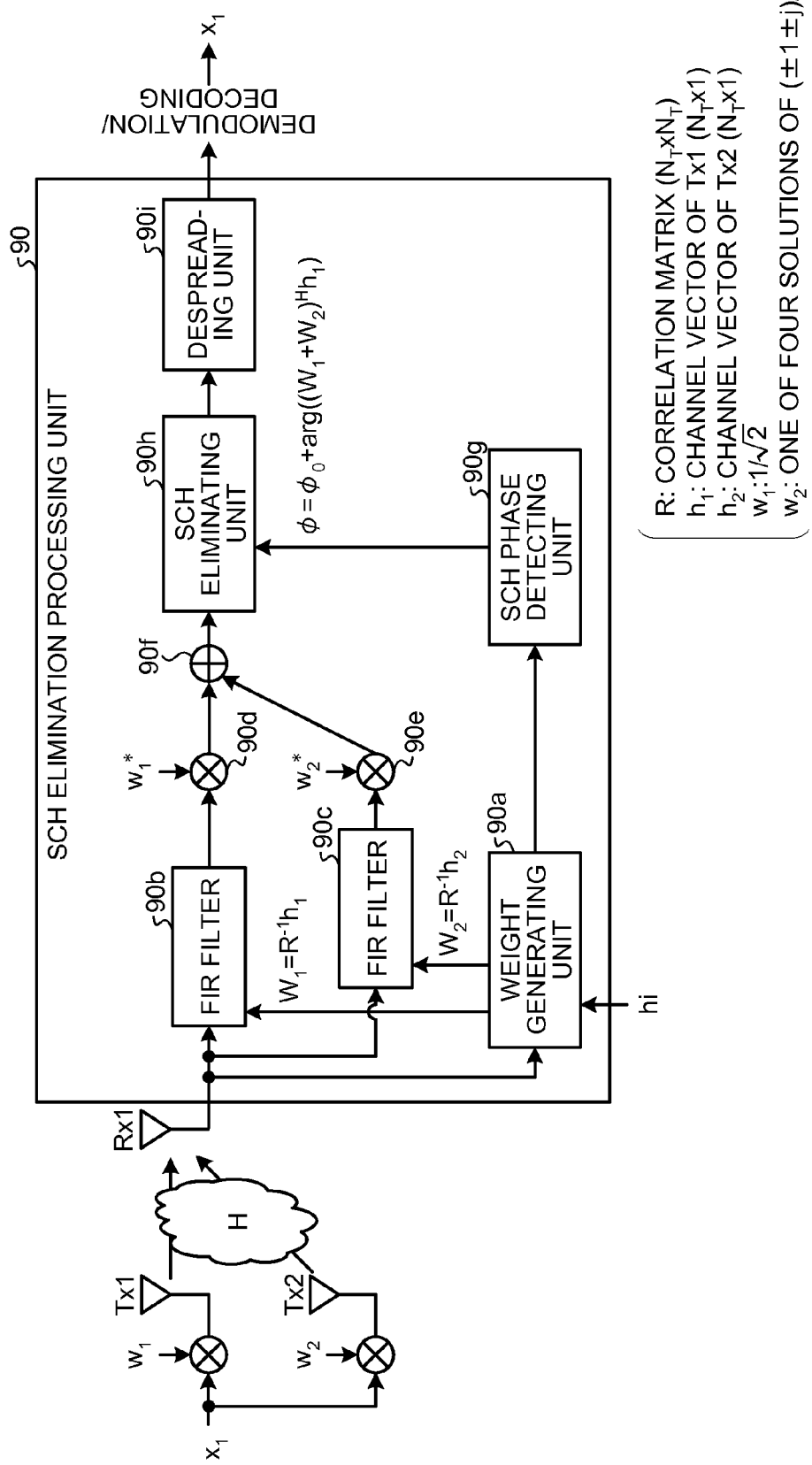
FIG. 10 is an exemplary block diagram of an SCH elimination processing unit in a wireless receiver according to a fifth embodiment of the present invention.

FIG. 10 is an exemplary block diagram of an SCH elimination processing unit in a wireless receiver according to the fifth embodiment. Herein, in order to enable phase adjustment at the receiving end, it is assumed that a signal obtained by multiplexing a signal $x_1$, which is multiplied by a transmission weight $w_1$, and an SCH is transmitted via an antenna Tx1; and a signal $x_2$ that is multiplied by a transmission weight $w_2$ is transmitted via an antenna Tx2. Herein, apart from the SCH elimination processing unit, the other control units are identical to those described in the fourth embodiment. Hence, the description of the other control units is not repeated.

Under the abovementioned conditions, in an SCH elimination processing unit 90 in the wireless receiver according to the fifth embodiment; the signal $x_1$ transmitted via the antenna Tx1 and the signal $x_2$ transmitted via the antenna Tx2 are received by an antenna Rx1 and output to each of a weight generating unit 90a, an FIR filter 90b, and an FIR filter 90c.

For a correlation matrix R and a channel estimate value (channel vector) $h_1$ in the antenna Tx1 regarding N number of taps in the FIR filter 90b, the weight generating unit 90a calculates a weight vector $W_1$ as $W_1 = R^{-1} \times h_1$. Then, the weight generating unit 90a inputs the calculated weight vector ($W_1 = R^{-1} \times h_1$) to the FIR filter 90b. Moreover, for a correlation matrix R and a channel estimate value (channel vector) $h_2$ in the antenna Tx2 regarding N number of taps in the FIR filter 90c, the weight generating unit 90a calculates a weight vector $W_2$ as $W_2 = R^{-1} \times h_2$. Then, the weight generating unit 90a inputs the calculated weight vector ($W_2 = R^{-1} \times h_2$) to the FIR filter 90c.

The FIR filter 90b is an apparatus such as an equalizer for equalizing digital signals that are obtained by converting the signals received via the antenna Rx1 using a digital conversion unit. For example, to each signal that has been made to pass through shift registers corresponding to the number of taps, the FIR filter 90b multiplies the complex conjugate of the weight vector ($W_1 = R^{-1} \times h_1$) input by the weight generating unit 90a. Then, the FIR filter 90b adds up the signals that have been multiplied by the complex conjugate of the weight vector ($W_1$) and outputs the addition result to a multiplier unit 90d.

The FIR filter 90c is an apparatus such as an equalizer for equalizing digital signals that are obtained by converting the signals received via the antenna Rx1 using a digital conversion unit. For example, to each signal that has been made to pass through shift registers corresponding to the number of taps, the FIR filter 90c multiplies the complex conjugate of the weight vector ($W_2 = R^{-1} \times h_2$) input by the weight generating unit 90a. Then, the FIR filter 90c adds up the signals that have been multiplied by the complex conjugate of the weight vector ($W_2$) and outputs the addition result to a multiplier unit 90e.

The multiplier unit 90d multiplies the complex conjugate of $w_1$ (i.e., $w_1^*$) to the signals output by the FIR filter 90b and outputs the signals to an adder unit 90f. Similarly, the multiplier unit 90e multiplies the complex conjugate of $w_2$ (i.e., $w_2^*$) to the signals output by the FIR filter 90c and outputs the signals to the adder unit 90f. Then, the adder unit 90f adds up the signals output by the multiplier unit 90d and the signals output by the multiplier unit 90e, and outputs the addition result to an SCH eliminating unit 90h.

As illustrated in FIG. 10, an SCH phase detecting unit 90g calculates a phase φ using the equalization result regarding the antenna Tx1, that is, using the phase $\phi_0$ included in the signals output by the FIR filter 90b and using the weight vectors $W_1$ and $W_2$, and then outputs the calculated phase φ to the SCH eliminating unit 90h. Meanwhile, identical to the fourth embodiment, the phase $\phi_0$ is a known value.

In the case of decoding signals other than the SCH, the SCH eliminating unit 90h eliminates the SCH from the received signals. By implementing the same method as described in the fourth embodiment, the SCH eliminating unit 90h eliminates the SCH from the signals output by the adder unit 90f and outputs the remaining signals to a despreading unit 90i. More particularly, the SCH eliminating unit 90h multiplies "$e^{-j\phi}$" to the signals output by the adder unit 90f, rotates the phase of the received signals by "φ", and shifts the phase to the signal points on the I axis. Then, using the complex conjugate of the known SCH code, the SCH eliminating unit 90h performs despreading with respect to the signals equalized by the FIR filter 90b and estimates the signal amplitude of the non-orthogonal code.

Subsequently, the SCH eliminating unit 90h first multiplies 1/SF to the estimated signal amplitude, then further multiplies "$e^{j\phi}$" to the multiplied signals, performs inverse rotation of the rotated phase by "φ", and returns the phase to the phase of the original signal points. Then, the SCH eliminating unit 90h multiplies the known SCH to the signals (the signal amplitude of the non-orthogonal code) having the returned phase; generates, as estimation, the SCH signal; eliminates the SCH signal from the received signals; and outputs the received signals having the SCH signal eliminated therefrom to the despreading unit 90i. In other words, the SCH eliminating unit 90h eliminates the SCH on the I axis.

Similarly, regarding the Q axis, the SCH eliminating unit 90h multiplies the known SCH to the signals (the signal amplitude of the non-orthogonal code) having the returned phase; generates, as estimation, the SCH signal; eliminates the SCH code from the signals output by the adder unit 90f; and outputs the received signals having the SCH signal eliminated therefrom to the despreading unit 90i. In other words, the SCH eliminating unit 90h eliminates the SCH on the Q axis.

Then, using the scrambling code and the channelization code, the despreading unit 90i performs despreading with respect to the received signals having the SCH signal eliminated therefrom. For example, with respect to the signals output by the SCH eliminating unit 90h, the despreading unit 90i performs descrambling using the scrambling code detected by the cell searching unit 54. Subsequently, with respect to the signals subjected to descrambling using the scrambling code, the despreading unit 90i performs despreading using the channelization code of the target signals for decoding, that is, using the channelization code assigned to itself, and outputs the post-despreading signals to an error correction/decoding unit. Subsequently, in an identical manner to the second embodiment, the error correction/decoding unit performs error correction and demodulation, and decodes the target signals for decoding.

In this way, according to the fifth embodiment, even in a transmission diversity environment, the SCH can be eliminated by detecting a rotating phase with a transmission channel and by adding to that a fixed phase. That makes it possible to accurately eliminate the SCH from the received signals.

[f] Sixth Embodiment

In the fifth embodiment, the description is given for a case when SCH elimination is performed after synthesizing the equalization results for the signals transmitted via the transmission antennas Tx1 and Tx2. However, the wireless receiver disclosed in the present invention is not limited to that case. For example, after the signals transmitted via the transmission antennas Tx1 and Tx2 are subjected to equalization, the wireless receiver disclosed in the present invention can perform SCH elimination with respect to the signals from the transmission antenna Tx1 and the signals from the transmission antenna Tx2 before performing signal synthesis.

Thus, in a sixth embodiment according to the present invention described below, an example is given when SCH elimination is performed after performing equalization of the signals transmitted via the transmission antennas Tx1 and Tx2 but before performing signal synthesis of those signals. Moreover, in the sixth embodiment, it is assumed that the SCH is transmitted via the antenna Tx1. Furthermore, since the signals are transmitted via two antennas, the wireless receiver is configured to include two FIR filters. However, the number of FIR filters is not limited to two.

More particularly, the SCH included in the equalization result for the antenna Tx1 is identical to that in the fourth embodiment. Hence, the SCH amplitude is accurately estimated using the method described in the fourth embodiment. In contrast, since the SCH included in the equalization result for the antenna Tx2 undergoes changes in phase and amplitude according to the propagation channel, it is not possible to eliminate the SCH using the method described in the fourth embodiment. Therefore, fluctuation in the complex conjugate is estimated from a combining weight $W_2$ of an equalizer and from the propagation channel ($h_1$) of the antenna Tx1 and the SCH amplitude estimation result in the antenna Tx1 is multiplied by the estimated fluctuation to estimate the SCH signal in the antenna Tx2. Following that, SCH elimination is performed.

Figure 11:
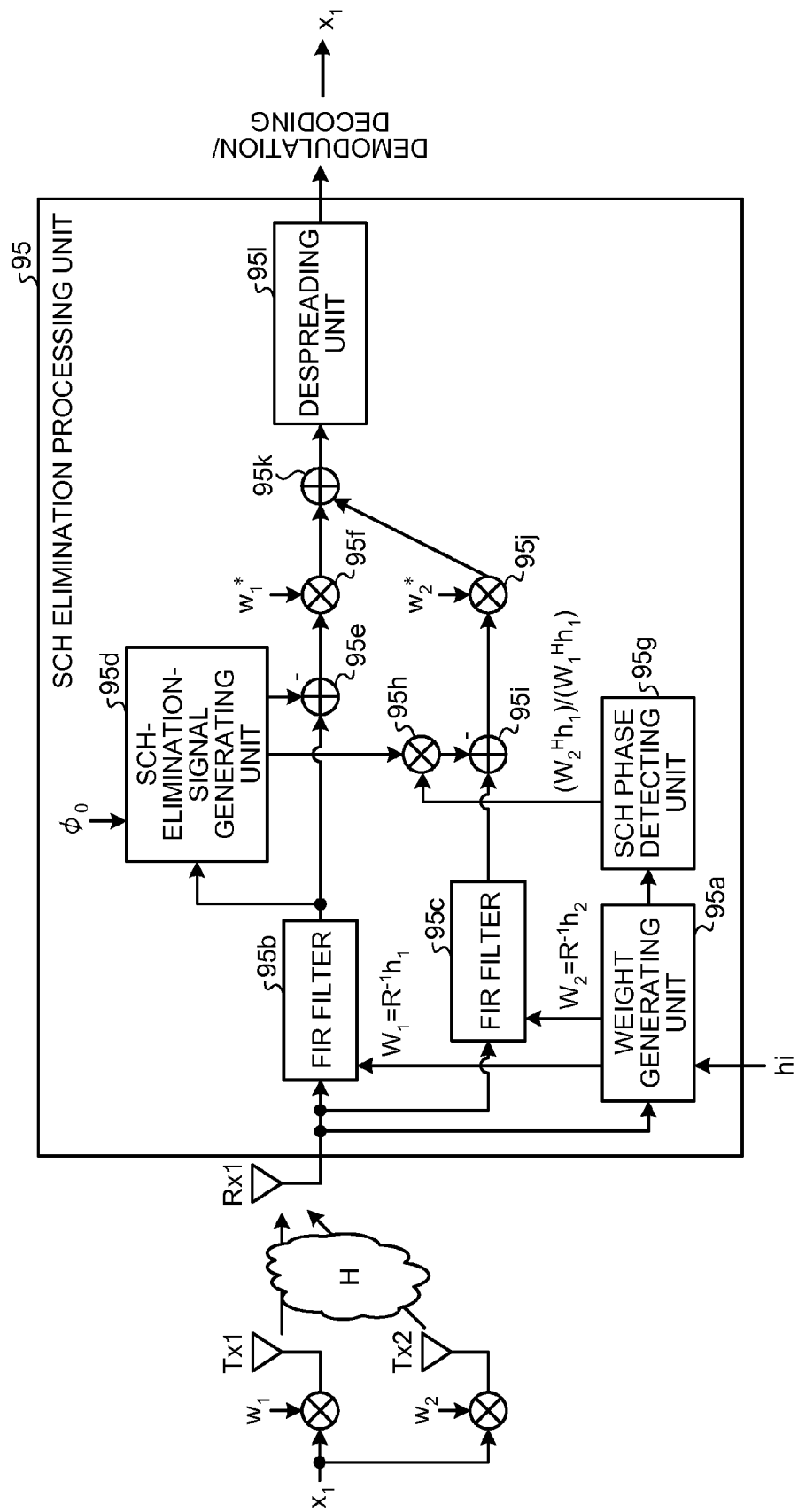
FIG. 11 is an exemplary block diagram of an SCH elimination processing unit in a wireless receiver according to a sixth embodiment of the present invention.

The abovementioned example is described with reference to FIG. 11, which is an exemplary block diagram of a configuration of an SCH elimination processing unit in the wireless receiver according to the sixth embodiment. Herein, in order to enable phase adjustment at the receiving end, it is assumed that a signal obtained by multiplexing the signal $x_1$, which is multiplied by the transmission weight $w_1$, and an SCH is transmitted via the antenna Tx1; while the signal $x_2$ that is multiplied by the transmission weight $w_2$ is transmitted via the antenna Tx2. Herein, apart from the SCH elimination processing unit, the other control units are identical to those described in the fourth embodiment. Hence, the description of the other control units is not repeated.

Under the abovementioned conditions, in an SCH elimination processing unit 95 in the wireless receiver according to the sixth embodiment; the signal $x_1$ transmitted via the antenna Tx1 and the signal $x_2$ transmitted via the antenna Tx2 are received via the antenna Rx1 and are output to each of a weight generating unit 95a, an FIR filter 95b, and an FIR filter 95c.

For a correlation matrix R and a channel estimate value (channel vector) $h_2$ in the antenna Tx1 regarding N number of taps in the FIR filter 95b, the weight generating unit 95a calculates the weight vector $W_1$ as $W_1 = R^{-1} \times h_1$. Then, the weight generating unit 95a inputs the calculated weight vector ($W_2 = R^{-1} \times h_1$) to the FIR filter 95b. Moreover, for a correlation matrix R and a channel estimate value (channel vector) $h_2$ in the antenna Tx2 regarding N number of taps in the FIR filter 95c, the weight generating unit 95a calculates the weight vector $W_2$ as $W_2 = R^{-1} \times h_2$. Then, the weight generating unit 95a inputs the calculated weight vector ($W_2 = R^{-1} \times h_2$) to the FIR filter 95c.

Each of the FIR filter 95b and the FIR filter 95c is an apparatus such as an equalizer for equalizing digital signals that are obtained by converting the signals received via the antenna Rx1 using a digital conversion unit. For example, to each signal that has been made to pass through shift registers corresponding to the number of taps, the FIR filter 95b multiplies the complex conjugate of the weight vector ($W_1 = R^{-1} \times h_1$) input by the weight generating unit 95a. Then, the FIR filter 95b adds up the signals that have been multiplied by the complex conjugate of the weight vector ($W_1$) and outputs the addition result to an SCH-elimination-signal generating unit 95d and to an eliminating unit 95e.

Similarly, to each signal that has been made to pass through shift registers corresponding to the number of taps, the FIR filter 95c multiplies the complex conjugate of the weight vector ($W_2 = R^{-1} \times h_2$) input by the weight generating unit 95a. Then, the FIR filter 95c adds up the signals that have been multiplied by the complex conjugate of the weight vector ($W_2$) and outputs the addition result to an eliminating unit 95i.

The SCH-elimination-signal generating unit 95d estimates the SCH using the equalization result regarding the antenna Tx1, that is, using the phase $\phi_0$ included in the output signals from the FIR filter 95b. More particularly, the SCH-elimination-signal generating unit 95d multiplies "$e^{-j\phi_0}$" to the signals output by the FIR filter 95b, rotates the phase of the received signals by "$\phi_0$", and shifts the phase to the signal points on the I axis. Then, on the I axis, the SCH-elimination-signal generating unit 95d makes use of the known complex conjugate of the SCH code for performing despreading with respect to the signals equalized by the FIR filter 95b and estimates the signal amplitude of the non-orthogonal code. Subsequently, the SCH-elimination-signal generating unit 95d multiplies 1/SF to the estimated signal amplitude, further multiplies "$e^{j\phi_0}$" to the signals multiplied by 1/SF, performs inverse rotation of the rotated phase by "$\phi_0$", and returns the phase to the phase of the original signal points.

In an identical manner, on the Q axis, the SCH-elimination-signal generating unit 95d multiplies the known SCH code to the signals (the signal amplitude of the non-orthogonal code) having the returned phase and generates, as estimation, the SCH signal. Upon estimating the SCH signal, the SCH-elimination-signal generating unit 95d outputs that SCH signal to the eliminating unit 95e and to a multiplier unit 95h.

From the signals equalized by the FIR filter 95b, the eliminating unit 95e eliminates the SCH code estimated by the SCH-elimination-signal generating unit 95d and outputs the received signals having the SCH eliminated therefrom to a multiplier unit 95f. Then, the multiplier unit 95f multiplies the complex conjugate of $w_1$ (i.e., $w_1^*$) to the signals having the SCH signal eliminated therefrom and outputs the signals to an adder unit 95k.

Meanwhile, from the combining weight $W_2$ of the FIR filter 95c and the transmission channel ($h_1$) of the antenna Tx1, an SCH phase detecting unit 95g estimates a complex conjugate fluctuation ($W_2^H h_1$)/($W_1^H h_1$) and outputs it to the multiplier unit 95h. Then, the multiplier unit 95h multiplies the SCH code output by the SCH-elimination-signal generating unit 95d to the complex conjugate fluctuation ($W_2^H h_1$)/($W_1^H h_1$) and outputs the multiplication result to the eliminating unit 95i. Herein, H represents the Hermitian transpose.

The eliminating unit 95i then removes the signals having the complex conjugate fluctuation ($W_2^H h_1$)/($W_i^H h_1$) multiplied by the SCH code from the signals equalized by the FIR filter 95c and outputs the remaining signals to a multiplier unit 95j. Then, the multiplier unit 95j multiplies the complex conjugate of $w_2$ (i.e., $w_2^*$) to the signals having the SCH eliminated therefrom and outputs the signals to the adder unit 95k. Subsequently, the adder unit 95k adds up the signals that are obtained by eliminating the SCH from the signals equalized by the FIR filter 95b and the signals that are obtained by eliminating the SCH from the signals equalized by the FIR filter 95c, and outputs the addition result to a despreading unit 95l.

The despreading unit 95l performs despreading with respect to the received signals having the SCH signal eliminated therefrom using the scrambling code and the channelization code. For example, with respect to the signals output by the SCH eliminating unit 90h, the despreading unit 95l performs descrambling using the scrambling code detected by a cell searching unit. Subsequently, with respect to the signals descrambled using the scrambling code, the despreading unit 95l performs further despreading using the channelization code of the target signals for decoding, that is, using the channelization code assigned to itself, and outputs the post-despreading signals to an error correction/decoding unit. Then, in an identical manner to the second embodiment, the error correction/decoding unit performs error correction and demodulation, and decodes the target signals for decoding.

In this way, according to the sixth embodiment, the SCH can be accurately eliminated from the received signals even in the case when SCH elimination is performed after performing equalization of the signals transmitted via the transmission antennas Tx1 and Tx2 but before performing signal synthesis of those signals.

[g] Seventh Embodiment

Meanwhile, even when the transmission is performed using the multiple input multiple output (MIMO) technology, the SCH can be accurately eliminated by implementing the method described in the sixth embodiment. In a seventh embodiment according to the present invention described below, an example is given with reference to FIG. 12 for accurately eliminating the SCH when the transmission is performed using the MIMO technology.

Figure 12:
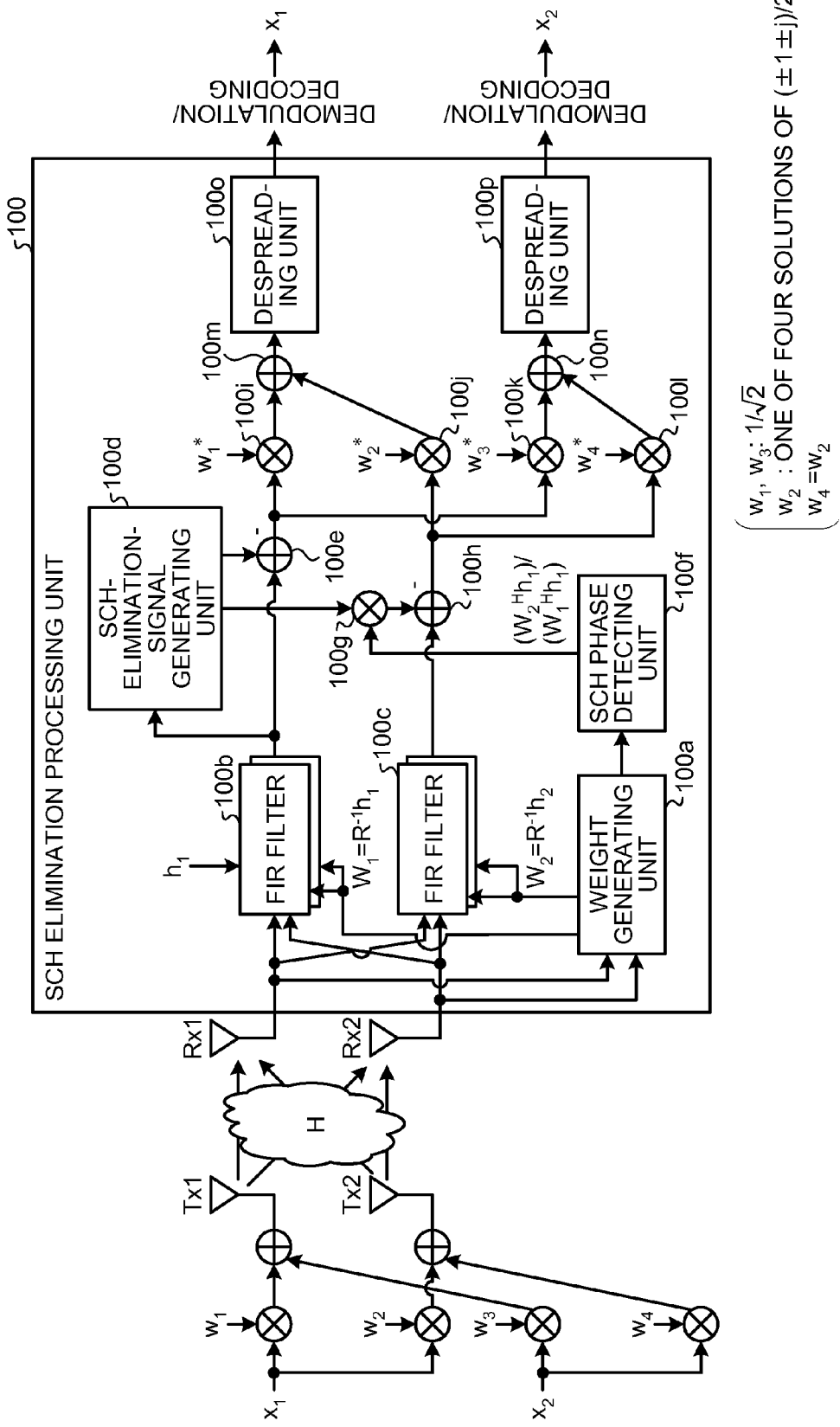
FIG. 12 is an exemplary block diagram of an SCH elimination processing unit in a wireless receiver according to a seventh embodiment of the present invention.

FIG. 12 is an exemplary block diagram of a configuration of an SCH elimination processing unit in a wireless receiver according to the seventh embodiment. Herein, it is assumed that a signal obtained by multiplexing the signal $x_1$ that is multiplied by the transmission weight $w_1$, the signal $x_2$ that is multiplied by a transmission weight $w_3$, and an SCH is transmitted via the antenna Tx1. Similarly, it is assumed that a signal obtained by multiplexing the signal $x_1$ that is multiplied by the transmission weight $w_2$ and the signal $x_2$ that is multiplied by a transmission weight $w_2$ is transmitted via the antenna Tx2. Herein, apart from the SCH elimination processing unit, the other control units are identical to those described in the fourth embodiment. Hence, the description of the other control units is not repeated.

Under the abovementioned conditions, in an SCH elimination processing unit 100 in the wireless receiver; the signals transmitted via the antennas Tx1 and Tx2 are received via the antenna Rx1 and output to each of a weight generating unit 100a, an FIR filter 100b, and an FIR filter 100c.

Figure 13:
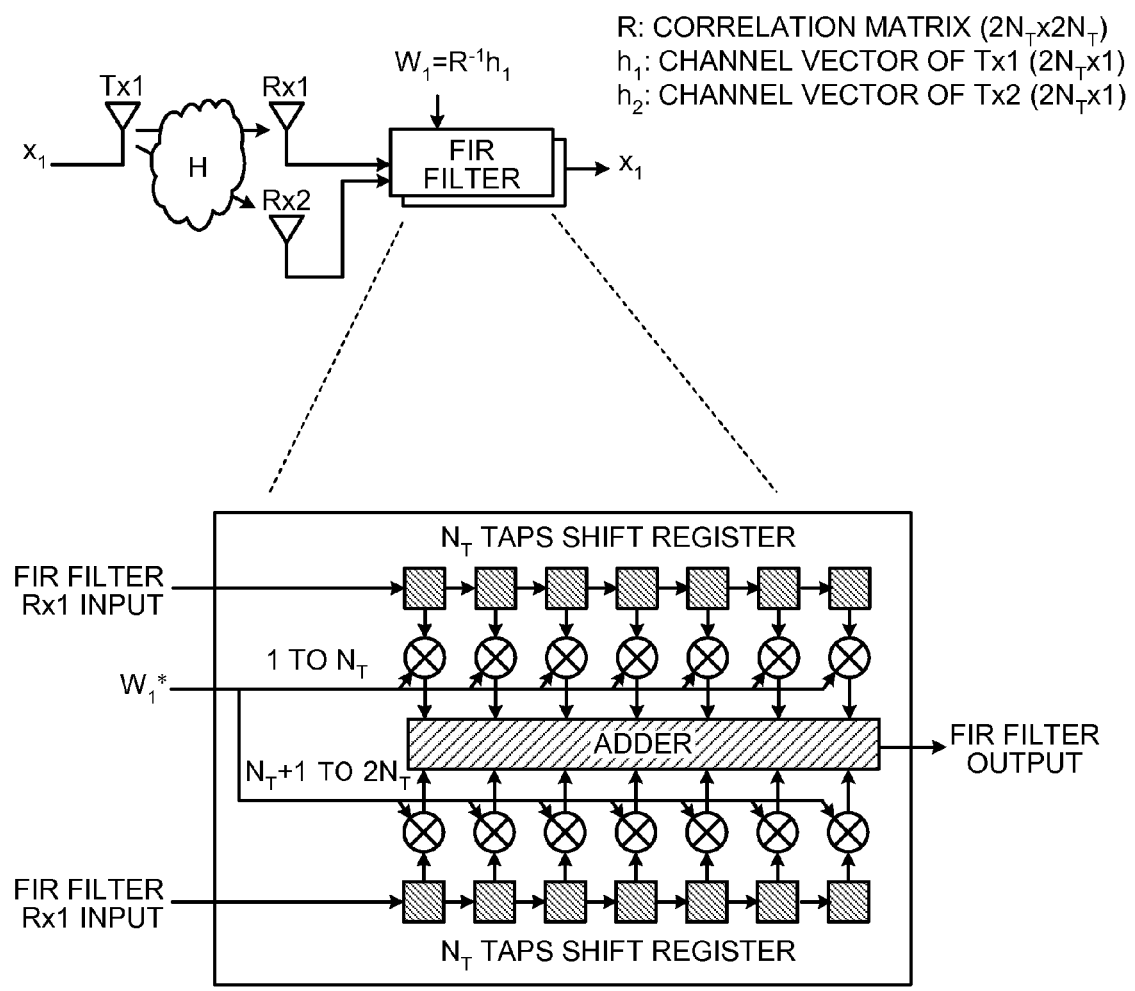
FIG. 13 is an explanatory diagram for explaining the weight to be input to an FIR filter according to the seventh embodiment.

The weight generating unit 100a makes use of channel estimate values (hi: channel vectors) for generating weight vectors ($W_1, W_2$) to be input to the FIR filter 100b and the FIR filter 100c, respectively. For example, as illustrated in FIG. 13, for a correlation matrix R and a channel estimate value $h_1$ regarding N number of taps in the FIR filter 100b, the weight generating unit 100a calculates the weight vector $W_1$ as $W_1 = R^{-1} \times h_1$. Then, the weight generating unit 100a inputs the calculated weight vector ($W_1 = R^{-1} \times h_1$) to the FIR filter 100b. Herein, FIG. 13 is an explanatory diagram for explaining the weight to be input to an FIR filter.

Moreover, for a correlation matrix R and a channel estimate value $h_2$ regarding N number of taps in the FIR filter 100c, the weight generating unit 100a calculates the weight vector $W_2$ as $W_2 = R^{-1} \times h_2$. Then, the weight generating unit 100a inputs the calculated weight vector ($W_2 = R^{-1} \times h_2$) to the FIR filter 100c.

The FIR filter 100b and the FIR filter 100c are disposed corresponding to the number of reception antennas. Each of the FIR filter 100b and the FIR filter 100c is an apparatus such as an equalizer for equalizing digital signals that are obtained by converting the signals received via the antenna Rx1 or an antenna Rx2 using a digital conversion unit.

For example, the FIR filter 100b makes each signal that is received via the antenna Rx1 to pass through shift registers corresponding to the number of taps and multiplies, to each of those signals, the complex conjugate of the weight vector ($W_1 = R^{-1} \times h_1$) input by the weight generating unit 100a. Then, the FIR filter 100b outputs the signals that have been multiplied by the complex conjugate of the weight vector ($W_1$) to an SCH-elimination-signal generating unit 100d and to an eliminating unit 100e.

Moreover, the FIR filter 100b makes each signal that is received via the antenna Rx2 to pass through shift registers corresponding to the number of taps and multiplies, to each of those signals, the complex conjugate of the weight vector ($W_1 = R^{-1} \times h_1$) input by the weight generating unit 100a. Then, the FIR filter 100b outputs the signals that have been multiplied by the complex conjugate of the weight vector ($W_1$) to the SCH-elimination-signal generating unit 100d and to the eliminating unit 100e.

Similarly, the FIR filter 100c makes each signal that is received via the antenna Rx1 to pass through shift registers corresponding to the number of taps and multiplies, to each of those signals, the complex conjugate of the weight vector ($W_2 = R^{-1} \times h_2$) input by the weight generating unit 100a. Then, the FIR filter 100c outputs the signals that have been multiplied by the complex conjugate of the weight vector ($W_2$) to an eliminating unit (adder unit) 100h.

Moreover, the FIR filter 100c makes each signal that is received via the antenna Rx2 to pass through shift registers corresponding to the number of taps and multiplies, to each of those signals, the complex conjugate of the weight vector ($W_2 = R^{-1} \times h_2$) input by the weight generating unit 100a. Then, the FIR filter 100c outputs the signals that have been multiplied by the complex conjugate of the weight vector ($W_2$) to the eliminating unit 100h.

Then, using the SCH phase $\phi_0$ included in the output signals from the FIR filter 100b, the SCH-elimination-signal generating unit 100d estimates the SCH and outputs the estimated SCH code to the multiplier unit 100g. Herein, the specific estimating method is identical to that described in the fourth embodiment or in the sixth embodiment. Hence, the description of the estimating method is not repeated.

From the signals equalized by the FIR filter 100b, the eliminating unit 100e eliminates the SCH code estimated by the SCH-elimination-signal generating unit 100d and outputs the received signals having the SCH eliminated therefrom to a multiplier unit 100i and a multiplier unit 100k.

Meanwhile, from the combining weight $W_2$ of the FIR filter 100c and the transmission channel ($h_1$) of the antenna Tx1, an SCH phase detecting unit 100f estimates a complex conjugate fluctuation $(W_2^H h_1)/(W_1^H h_1)$ and outputs it to a multiplier unit 100g. Then, the multiplier unit 100g multiplies the SCH code, which is output by the SCH-elimination-signal generating unit 100d, to the complex conjugate fluctuation $(W_2^H h_1)/(W_1^H h_1)$, which is output by the SCH phase detecting unit 100f, and outputs the multiplication result to the eliminating unit 100h. Subsequently, from the signals equalized by the FIR filter 100c, the eliminating unit 100h removes the signals having the complex conjugate fluctuation $(W_2^H h_1)/(W_1^H h_1)$ multiplied by the SCH code, and outputs the remaining signals to a multiplier unit 100j and to a multiplier unit 100l. Meanwhile, herein, H represents the Hermitian transpose.

Then, the multiplier unit 100i multiplies the complex conjugate of $w_1$ (i.e., $w_1^*$) to the signals that are equalized by the FIR filter 100b and that have the SCH eliminated therefrom, and outputs the signals to an adder unit 100m. Moreover, the multiplier unit 100j multiplies the complex conjugate of $w_2$ (i.e., $w_2^*$) to the signals that are equalized by the FIR filter 100c and that have the SCH eliminated therefrom, and outputs the signals to the adder unit 100m. Furthermore, the multiplier unit 100k multiplies the complex conjugate of $w_3$ (i.e., $w_3^*$) to the signals that are equalized by the FIR filter 100b and that have the SCH eliminated therefrom, and outputs the signals to an adder unit 100n. Similarly, the multiplier unit 100l multiplies the complex conjugate of $w_4$ (i.e., $w_4^*$) to the signals that are equalized by the FIR filter 100c and that have the SCH eliminated therefrom, and outputs the signals to the adder unit 100n.

Then, the adder unit 100m adds up the signals that are multiplied by the complex conjugate of $w_1$ (i.e., $w_1^*$) and that are output by the multiplier unit 100i and the signals that are multiplied by the complex conjugate of $w_2$ (i.e., $w_2^*$) and that are output by the multiplier unit 100j, and outputs the addition result to a despreading unit 100o. Similarly, the adder unit 100n adds up the signals that are multiplied by the complex conjugate of $w_3$ (i.e., $w_3^*$) and that are output by the multiplier unit 100k and the signals that are multiplied by the complex conjugate of $w_4$ (i.e., $w_4^*$) and that are output by the multiplier unit 100l, and outputs the addition result to a despreading unit 100p.

With respect to the signals output by the adder unit 100m, the despreading unit 100o performs descrambling using the scrambling code detected by a cell searching unit. Subsequently, with respect to the signals descrambled using the scrambling code, the despreading unit 100o performs further despreading using the channelization code assigned to itself, and outputs the post-despreading signals to an error correction/decoding unit. Then, in an identical manner to the second embodiment, the error correction/decoding unit performs error correction and demodulation, and decodes the target signals for decoding.

With respect to the signals output by the adder unit 100n, the despreading unit 100p performs descrambling using the scrambling code detected by a cell searching unit. Subsequently, with respect to the signals descrambled using the scrambling code, the despreading unit 100p performs further despreading using the channelization code assigned to itself, and outputs the post-despreading signals to an error correction/decoding unit. Then, in an identical manner to the second embodiment, the error correction/decoding unit performs error correction and demodulation, and decodes the target signals for decoding.

In this way, according to the seventh embodiment, even when the transmission is performed using the MIMO technology, the method identical to that described in the sixth embodiment can be implemented so that it becomes possible to accurately eliminate the SCH before performing signal synthesis.

[h] Eighth Embodiment

Besides the abovementioned embodiments of the present invention, it is also possible to implement the present invention in various other forms. An eighth embodiment of the present invention, which is different than the first seven embodiments, will be explained below.

Averaging of SCH Amplitude

Figure 14:
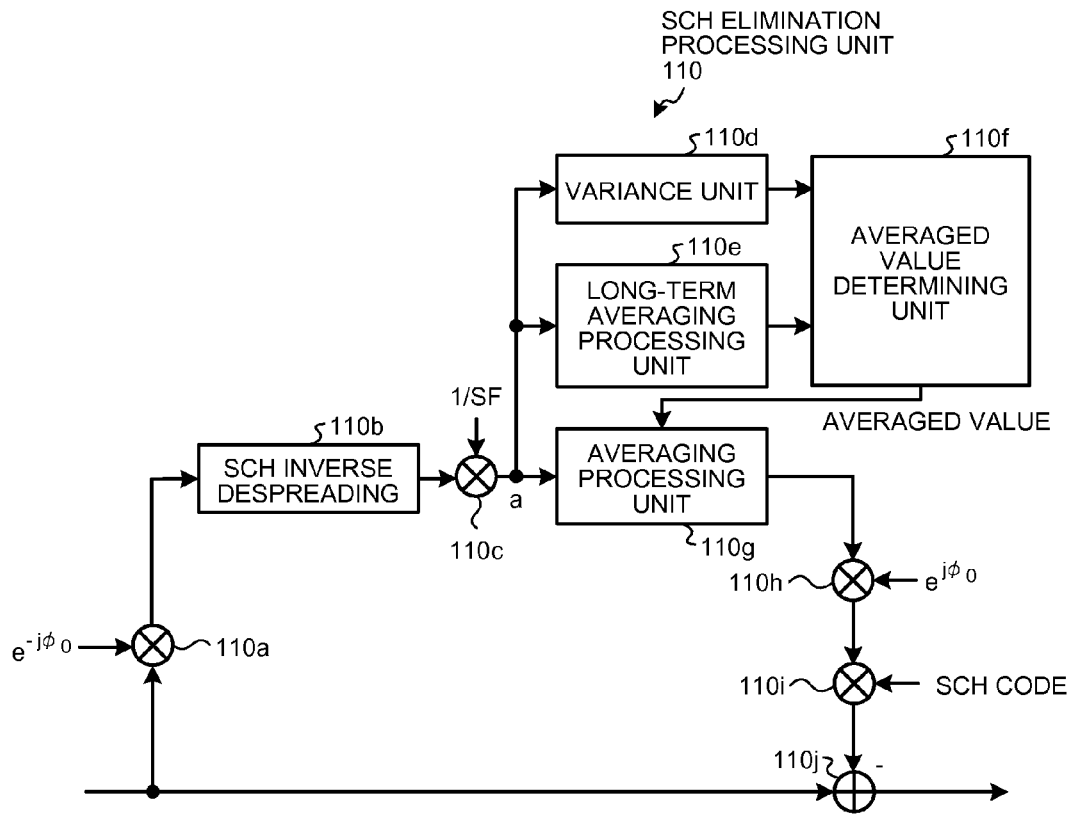
FIG. 14 is an exemplary schematic diagram of a configuration of an SCH elimination processing unit that incorporates averaging processing.

For example, since a non-orthogonal code such as the SCH acts as the interference source, it is not desirable to multiplex many of such codes. In the case of the W-CDMA technology, the SCH is inserted in only the header position of each slot and has a relatively small electrical power. Hence, with respect to the signals that have passed through an equalizer and that have the phase relatively in step with the amplitude; as illustrated in FIG. 14, the average and the variance of the amplitude is compared and, if that ratio exceeds a reference value, then the averaged value is changed dynamically by performing an operation for changing the averaged value. That enables achieving further enhancement in the SCH elimination accuracy. FIG. 14 is an exemplary schematic diagram of a configuration of an SCH elimination processing unit that incorporates averaging processing. Herein, although the description is given with reference to the average and the variance of the amplitude, the averaged value can also be changed based on a rate of transfer detected separately.

For example, as illustrated in FIG. 14, a multiplier unit 110a multiplies "$e^{-j\phi_0}$" to the signals equalized by an FIR filter, rotates the phase of the received signals by "$\phi_0$", and shifts the phase to the signal points on the I axis. Then, using the complex conjugate of the known SCH code, an SCH despreading unit 110b performs despreading with respect to the signals having the phase rotated by the multiplier unit 110a and estimates the signal amplitude of the non-orthogonal code. Subsequently, a multiplier unit 110c generates a signal (a) by multiplying 1/SF to the estimated signal amplitude and outputs the signal (a) to a variance unit 110d, a long-term averaging processing unit 110e, and an averaging processing unit 110g.

The variance unit 110d calculates the variance or the standard deviation of the SCH in each slot in the signal (a) that is output by the multiplier unit 110c. In other words, the variance unit 110d calculates the variance or the standard deviation of the signal amplitude of the non-orthogonal code and outputs it to an averaged value determining unit 110f. The long-term averaging processing unit 110e calculates the average of the SCH corresponding to a predetermined number of frames (e.g., one frame). In other words, the long-term averaging processing unit 110e calculates the average of the signal amplitude of the non-orthogonal code and outputs it to the averaged value determining unit 110f.

Based on the result output by the variance unit 110d and the result output by the long-term averaging processing unit 110e, the averaged value determining unit 110f decides on the number of slots to be subjected to averaging. More particularly, if the variance is smaller than the result of the long-term averaging processing unit 110e, then the averaged value determining unit 110f increases the number of slots to be subjected to averaging. For example, if the variance value calculated by the variance unit 110d is equal to or smaller than one-third of the result output by the long-term averaging processing unit 110e, then the averaged value determining unit 110f determines that seven slots are to be subjected to averaging and outputs that number to the averaging processing unit 110g.

Then, the averaging processing unit 110g outputs, to a multiplier unit 110h, the result of averaging the signal amplitudes of the non-orthogonal codes in the slots corresponding to the averaged value. The multiplier unit 110h then multiplies "$e^{j\phi_0}$" to the signals output by the averaging processing unit 110g, performs inverse rotation of the rotated phase by "$\phi_0$", returns the phase to the phase of the original signal points, and multiples the signals by the known SCH code.

Subsequently, from the signals equalized by an FIR filter, an eliminating unit 110j eliminates the SCH calculated by a multiplier unit 110i and outputs the received signals having the SCH signal eliminated therefrom to a despreading unit. Since the subsequent processing is identical to that described in the fourth embodiment, the detailed explanation thereof is not repeated. As a result of such processing, it becomes possible to further enhance the SCH elimination accuracy.

Normalization of SCH Amplitude

Figure 15:
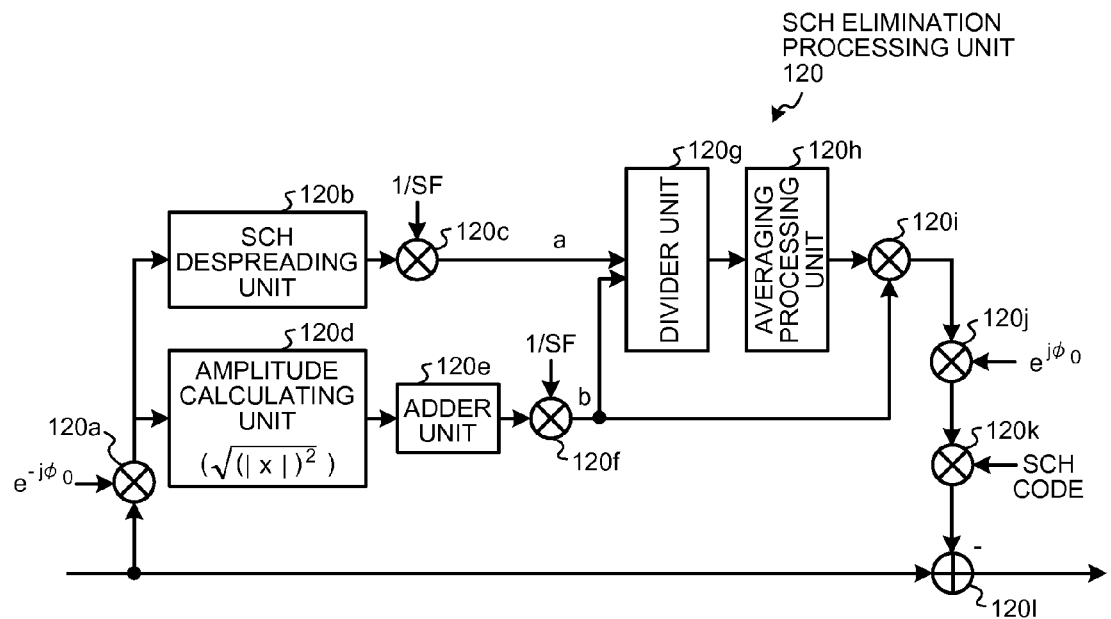
FIG. 15 is an exemplary schematic diagram of a configuration of an SCH elimination processing unit that incorporates normalization processing.

For example, although the SCH amplitude fluctuates due to fading, the electrical power of the SCH with respect to the total transmission power is viewed to remain roughly constant. Therefore, as illustrated in FIG. 15, the SCH amplitude is normalized by the root-mean-square amplitude of the received signals before performing the averaging processing and an instantaneous estimate value of the SCH amplitude is obtained by multiplying the signal amplitude by the instantaneous root-mean-square amplitude of the received signals. As a result, even if the amplitude undergoes large fluctuation, the averaging processing can be performed in an accurate manner. Meanwhile, the normalization can also be performed using the absolute values of the received signals or the absolute values of the real part and the imaginary part of the received signals. FIG. 15 is an exemplary schematic diagram of a configuration of an SCH elimination processing unit that incorporates normalization processing.

For example, as illustrated in FIG. 15, a multiplier unit 120a multiplies "$e^{-j\phi_0}$" to the signals equalized by an FIR filter, rotates the phase of the received signals by "$\phi_0$", and shifts the phase to the signal points on the I axis. Then, using the complex conjugate of the known SCH code, an SCH despreading unit 120b performs despreading with respect to the signals having the phase rotated by the multiplier unit 120a and estimates the signal amplitude of the non-orthogonal code. Subsequently, a multiplier unit 120c generates a signal (a) by multiplying 1/SF to the estimated signal amplitude and outputs the signal (a) to a divider unit 120g.

Meanwhile, an amplitude calculating unit 120d calculates the magnitudes of the signals having the phase rotated by the multiplier unit 120a. An adder unit 120e then adds up the magnitudes of the signals calculated by the amplitude calculating unit 120d. As a result, the root-mean-square amplitude of the signals having the phase rotated by the multiplier unit 120a is calculated and the SCH amplitude is normalized. Subsequently, a multiplier unit 120f generates a signal (b) by multiplying 1/SF to the normalized SCH amplitude, which is the signal output by the adder unit 120e, and outputs the signal (b) to the divider unit 120g and to a multiplier unit 120i.

The divider unit 120g outputs, to an averaging processing unit 120h, the result of dividing the signal (a), which is output by the multiplier unit 120c, by the signal (b), which is output by the multiplier unit 120f. Based on the value of (a/b) output by the divider unit 120g, the averaging processing unit 120h decides on the number of slots to be subjected to averaging, performs averaging for the decided number of slots, and outputs the averaged value to the multiplier unit 120i. For example, if the value of (a/b) output by the divider unit 120g is smaller than a threshold value, then the averaging processing unit 120h determines that five slots are to be subjected to averaging and calculates the average of the SCH amplitude of five slots, that is, calculates the average of the signal amplitudes of the non-orthogonal codes of five slots.

The multiplier unit 120i multiplies the signal (b) that is calculated by the multiplier unit 120f to the signal (signal amplitude of the non-orthogonal code) that is output by the divider unit 120g, so that the amplitude returns to the condition at the time of reception. Then, the multiplier unit 120*i* calculates the instantaneous signal amplitude of the non-orthogonal code and outputs it to a multiplier unit 120*j*.

The multiplier unit 120*j* then multiplies "$e^{j\phi_0}$" to the signals output by the averaging processing unit 120*h*, performs inverse rotation of the rotated phase by "$\phi_0$", returns the phase to the phase of the original signal points, multiples the signals by the known SCH code, and outputs those signals to an eliminating unit 120*k*. Subsequently, the eliminating unit 120*k* eliminates the SCH calculated by the multiplier unit 120*j* from the signals equalized by an FIR filter and outputs the received signals having the SCH signal eliminated therefrom to a despreading unit. Since the subsequent processing is identical to that described in the fourth embodiment, the detailed explanation thereof is not repeated. As a result of such processing, even if the amplitude undergoes large fluctuation, it becomes possible to further enhance the SCH elimination accuracy. Meanwhile, the normalization can also be performed using the absolute values of the received signals or the absolute values of the real part and the imaginary part of the received signals.

System Configuration

Of the processes described in the embodiments, all or part of the processes explained as being performed automatically can be performed manually. Similarly, all or part of the processes explained as being performed manually can be performed automatically by a known method. Besides, the processing procedures, the control procedures, specific names, various data, and information including parameters described in the embodiments or illustrated in the drawings can be changed as required unless otherwise specified.

The constituent elements of the device illustrated in the drawings are merely conceptual, and need not be physically configured as illustrated. The constituent elements, as a whole or in part, can be separated or integrated either functionally or physically based on various types of loads or use conditions. For example, the channel estimating unit 56 and the SCH processing unit 60 can be integrated. Besides, the process functions performed by the device are entirely or partially realized by the CPU or computer programs that are analyzed and executed by the CPU, or realized as hardware by wired logic.

The wireless communication method described in the present embodiments can be implemented by executing a program written in advance in a computer such as a personal computer (PC) or a workstation. The program can be distributed over a network such as the Internet. Alternatively, the program can be stored in a computer-readable recording medium such as a hard disk drive, a flexible disk (FD), a compact disk read only memory (CD-ROM), a magneto-optical (MO) disk, and a digital versatile disk (DVD) such that a computer can read the program from the recording medium and execute it.

Thus, according to an aspect of the wireless receiver, the wireless communication system, and the wireless communication method disclosed in the present invention; at the time of decoding signals other than a synchronization signal, it is possible to accurately eliminate the interference from the synchronization signal.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A wireless receiver comprising:
a receiving unit that receives a signal obtained by multiplexing a plurality of signals that include a synchronization signal that is spread using a non-orthogonal code not orthogonal to a code for spreading other signals other than the synchronization signal;
an amplitude estimating unit that performs, in a case when the other signals are target signals for decoding, despreading with respect to the signal received by the receiving unit using the synchronization signal, and estimates signal amplitude of the non-orthogonal code;
a signal eliminating unit that eliminates the synchronization signal in spread form from the signal received by the receiving unit using the signal amplitude of the non-orthogonal code estimated by the amplitude estimating unit and using the synchronization signal; and
a decoding unit that performs despreading and demodulation with respect to the signal having the synchronization signal in spread form eliminated therefrom, and decodes the target signals for decoding.

2. The wireless receiver according to claim 1, further comprising an equalizing unit that equalizes the signal received by the receiving unit, wherein
with respect to the signal equalized by the equalizing unit, the amplitude estimating unit performs despreading using the synchronization signal and estimates signal amplitude of the non-orthogonal code, and
using the signal amplitude of the non-orthogonal code and using the synchronization signal, the signal eliminating unit eliminates the synchronization signal in spread form from the signal equalized by the equalizing unit.

3. The wireless receiver according to claim 2, wherein
when a phase of the synchronization signal is a known phase, then, in a rotated state of the synchronization signal rotated equivalent to the phase, the amplitude estimating unit uses the synchronization signal for performing despreading with respect to the signal equalized by the equalizing unit and estimates signal amplitude of the non-orthogonal code, and
the signal eliminating unit performs inverse rotation of the synchronization signal equivalent to the phase by which the synchronization signal has been rotated and, using the signal amplitude of the non-orthogonal code and using the synchronization signal, and eliminates the synchronization signal in spread form from the signal equalized by the equalizing unit.

4. The wireless receiver according to claim 3, further comprising:
a first equalizing unit that performs, in a case when the signal received by the receiving unit is a signal transmitted via a plurality of antennas, equalization with respect to a transmission antenna that is used in transmitting a signal including the synchronization signal;
a second equalizing unit that performs equalization with respect to an antenna other than the antenna that is used in transmitting the signal including the synchronization signal; and
a phase detecting unit that detects a rotating phase based on a weight vector of each of the first equalizing unit and the second equalizing unit, based on a channel estimate value of the antenna that is used in transmitting the signal including the synchronization signal, and based on the known phase of the synchronization signal, wherein in a rotated state of the synchronization signal rotated equivalent to the rotating phase detected by the phase detecting unit, the amplitude estimating unit uses the synchronization signal for performing despreading with respect to a signal obtained by adding the signal equalized by the first equalizing unit and the signal equalized by the second equalizing unit and estimates signal amplitude of the non-orthogonal code, and the signal eliminating unit performs inverse rotation of the synchronization signal equivalent to the rotating phase by which the synchronization signal has been rotated and, using the signal amplitude of the non-orthogonal code and using the synchronization signal, and eliminates the synchronization signal in spread form from the signal obtained by adding the signal equalized by the first equalizing unit and the signal equalized by the second equalizing unit.

5. The wireless receiver according to claim 3, further comprising:

a first equalizing unit that performs, in a case when the signal received by the receiving unit is a signal transmitted via a plurality of antennas, equalization with respect to a transmission antenna that is used in transmitting a signal including the synchronization signal;

a second equalizing unit that performs equalization with respect to an antenna other than the antenna that is used in transmitting the signal including the synchronization signal;

a first amplitude estimating unit that performs, regarding the signal equalized by the first equalizing unit and in a rotated state of the synchronization signal rotated equivalent to the rotating phase that is a known phase, despreading with respect to the signal equalized by the first equalizing unit using the synchronization signal, and estimates signal amplitude of a first non-orthogonal code; and a second amplitude estimating unit that multiplies, regarding the signal equalized by the second equalizing unit, the signal amplitude of the first non-orthogonal code estimated by the first equalizing unit by a channel estimate value of an antenna that is used in transmitting a signal including the weight vector of the second equalizing unit and the synchronization signal, and estimates signal amplitude of a second non-orthogonal code, wherein the signal eliminating unit eliminates the synchronization signal in spread form from the signal equalized by the first equalizing unit using the signal amplitude of the first non-orthogonal code and using the synchronization signal, eliminates the synchronization signal in spread form from the signal equalized by the second equalizing unit using the signal amplitude of the second non-orthogonal code and using the synchronization signal, and then synthesizes the signal that is equalized by the first equalizing unit and that has the synchronization signal in spread form eliminated therefrom and the signal that is equalized by the second equalizing unit and that has the synchronization signal in spread form eliminated therefrom.

6. The wireless receiver according to claim 1, wherein the receiving unit receives via multipaths the signal obtained by multiplexing, for each path in the multipaths, the amplitude estimating unit estimates signal amplitude of the non-orthogonal code, for each path in the multipaths, the signal eliminating unit eliminates the synchronization signal in spread form from the signal received by the receiving unit using the signal amplitude of the non-orthogonal code estimated by the amplitude estimating unit and using the synchronization signal, and the decoding unit synthesizes the signal that corresponds to each path and that has the synchronization signal in spread form eliminated therefrom, performs despreading and demodulation, and decodes the target signals for decoding.

7. The wireless receiver according to claim 1, further comprising an averaged value calculating unit that determines, with respect to the signal amplitude of the non-orthogonal code estimated by the amplitude estimating unit, a number of slots to be subjected to averaging from a variance value of each slot and from an averaged value corresponding to a predetermined number of frames, and calculates average signal amplitude obtained by averaging signal amplitudes of non-orthogonal codes corresponding to determined number of slots, wherein the signal eliminating unit eliminates the synchronization signal in spread form from the signal received by the receiving unit using the average signal amplitude calculated by the averaged value calculating unit and using the synchronization signal.

8. The wireless receiver according to claim 1, further comprising an averaged value calculating unit that calculates root-mean-square amplitude of the signal received by the receiving unit, determines a number of slots to be subjected to averaging from the root-mean-square amplitude of the signal received by the receiving unit and from the signal amplitude of the non-orthogonal code estimated by the amplitude estimating unit, and calculates average signal amplitude obtained by averaging signal amplitudes of non-orthogonal codes corresponding to determined number of slots, wherein the signal eliminating unit eliminates the synchronization signal in spread form from the signal received by the receiving unit using the average signal amplitude calculated by the averaged value calculating unit and using the synchronization signal.

9. A wireless communication system comprising a wireless transmitter and a wireless receiver that perform mutual wireless communication, wherein the wireless transmitter includes a transmitting unit that transmits a signal obtained by multiplexing a plurality of signals that include a synchronization signal that is spread using a non-orthogonal code not orthogonal to a code for spreading other signals other than the synchronization signal, and the wireless receiver includes a receiving unit that receives the signal that is transmitted by the wireless transmitter and that is obtained by multiplexing a plurality of signals including the synchronization signal in spread form;

an amplitude estimating unit that performs, in a case when the other signals are target signals for decoding, despreading with respect to the signal received by the receiving unit using the synchronization signal, and estimates signal amplitude of the non-orthogonal code;

a signal eliminating unit that eliminates the synchronization signal in spread form from the signal received by the receiving unit using the signal amplitude of the non-orthogonal code estimated by the amplitude estimating unit and using the synchronization signal; and a decoding unit that performs despreading and demodulation with respect to the signal having the synchronization signal in spread form eliminated therefrom, and decodes the target signals for decoding.

10. A wireless communication method suitable for a wireless communication system including a wireless transmitter and a wireless receiver that perform mutual wireless communication, the wireless communication method comprising:

transmitting, by the wireless transmitter, a signal obtained by multiplexing a plurality of signals that include a synchronization signal that is spread using a non-orthogonal code not orthogonal to a code for spreading other signals other than the synchronization signal;

receiving, by the wireless receiver, the signal that is transmitted by the wireless transmitter and that is obtained by multiplexing a plurality of signals including the synchronization signal in spread form;

estimating, by the wireless receiver, that includes performing, in a case when the other signals are target signals for decoding, despreading with respect to the signal received at the receiving using the synchronization signal, and estimating signal amplitude of the non-orthogonal code;

eliminating, by the wireless receiver, the synchronization signal in spread form from the signal received at the receiving using the signal amplitude of the non-orthogonal code estimated at the estimating and using the synchronization signal; and decoding, by the wireless receiver, that includes performing despreading and demodulation with respect to the signal having the synchronization signal in spread form eliminated therefrom, and decoding the target signals for decoding.

* * * * *

UNITED STATES PATENT AND TRADEMARK OFFICE
CERTIFICATE OF CORRECTION

PATENT NO.        : 8,379,690 B2
APPLICATION NO.   : 12/893649
DATED             : February 19, 2013
INVENTOR(S)       : Tsuyoshi Hasegawa It is certified that error appears in the above-identified patent and that said Letters Patent is hereby corrected as shown below:

On the title page, Item (73), under the heading "ASSIGNEE", the phrase "Fujitsu Limted" should be rendered "Fujitsu Limited" instead.

Signed and Sealed this
Ninth Day of April, 2013

Teresa Stanek Rea
*Acting Director of the United States Patent and Trademark Office*